US 9,225,280 B2

(12) United States Patent
Okamura et al.

(10) Patent No.: US 9,225,280 B2
(45) Date of Patent: Dec. 29, 2015

(54) CONTROL DEVICE FOR ELECTRIC-POWERED VEHICLE, AND ELECTRIC-POWERED VEHICLE WITH CONTROL DEVICE AS WELL AS CONTROL METHOD FOR ELECTRIC-POWERED VEHICLE, AND COMPUTER-READABLE RECORDING MEDIUM BEARING PROGRAM FOR CAUSING COMPUTER TO EXECUTE CONTROL METHOD

(75) Inventors: Masaki Okamura, Toyota (JP); Natsuki Nozawa, Toyota (JP); Hideto Hanada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1460 days.

(21) Appl. No.: 12/449,353

(22) PCT Filed: Dec. 22, 2008

(86) PCT No.: PCT/JP2008/073316
§ 371 (c)(1),
(2), (4) Date: Aug. 4, 2009

(87) PCT Pub. No.: WO2009/090835
PCT Pub. Date: Jul. 23, 2009

(65) Prior Publication Data
US 2010/0185350 A1    Jul. 22, 2010

(30) Foreign Application Priority Data
Jan. 17, 2008    (JP) .................................. 2008-008201

(51) Int. Cl.
*B60L 9/00*         (2006.01)
*H02P 27/08*        (2006.01)
*B60L 11/08*        (2006.01)
(Continued)

(52) U.S. Cl.
CPC ................. *H02P 27/08* (2013.01); *B60L 11/08* (2013.01); *B60L 15/025* (2013.01); *H02P 21/06* (2013.01); *Y02T 10/643* (2013.01); *Y02T 10/70* (2013.01); *Y02T 10/7077* (2013.01)

(58) Field of Classification Search
USPC .............. 701/22, 36, 99; 318/400.03–400.04, 318/400.17, 798–803, 806–811
See application file for complete search history.

(56) References Cited

U.S. PATENT DOCUMENTS 4,599,549 A * 7/1986 Mutoh et al. ................... 318/798
4,758,938 A * 7/1988 Kanazawa ...................... 363/41
(Continued)

FOREIGN PATENT DOCUMENTS

EP    0 874 448 A1    10/1998
JP    A-5-184156      7/1993
(Continued)

*Primary Examiner* — Redhwan K Mawari
(74) *Attorney, Agent, or Firm* — Oliff PLC

(57) ABSTRACT

A carrier frequency setting unit sets a carrier frequency based on a torque command and a motor rotation number of a motor generator. A PWM signal producing unit produces phase modulated waves corresponding to respective phase voltage commands, and produces respective phase PWM signals corresponding to a relationship in magnitude between the respective phase modulated waves and a carrier having the carrier frequency. A PWM center control unit produces a PWM center correction value for variably controlling the PWM center when the carrier frequency is lower than a predetermined frequency, and provides the same to the PWM signal producing unit.

22 Claims, 25 Drawing Sheets

(51) Int. Cl.
  *B60L 15/02* (2006.01)
  *H02P 21/06* (2006.01)

(56) References Cited

U.S. PATENT DOCUMENTS

| | | | |
|---|---|---|---|
| 5,287,051 A * | 2/1994 | Konrad et al. | 318/803 |
| 5,467,262 A * | 11/1995 | Nakata et al. | 363/41 |
| 5,486,748 A * | 1/1996 | Konrad et al. | 318/811 |
| 5,614,804 A | 3/1997 | Kayano et al. | |
| 5,650,708 A * | 7/1997 | Sawada et al. | 318/801 |
| 5,699,240 A * | 12/1997 | Obayashi | 363/98 |
| 5,744,927 A * | 4/1998 | Hayashida | 318/599 |
| 5,801,508 A * | 9/1998 | Obayashi | 318/801 |
| 5,990,654 A * | 11/1999 | Skibinski et al. | 318/800 |
| 6,316,895 B1 * | 11/2001 | Ramarathnam | 318/400.02 |
| 7,928,686 B2 * | 4/2011 | Saha et al. | 318/807 |
| 2004/0207360 A1 * | 10/2004 | Matsushiro et al. | 318/811 |
| 2007/0175429 A1 * | 8/2007 | Yanagida et al. | 123/179.14 |
| 2009/0021198 A1 * | 1/2009 | Okamura et al. | 318/400.3 |
| 2011/0080131 A1 * | 4/2011 | Shimada et al. | 318/503 |

FOREIGN PATENT DOCUMENTS

| | | |
|---|---|---|
| JP | A-6-245577 | 9/1994 |
| JP | A-8-23698 | 1/1996 |
| JP | A-8-340691 | 12/1996 |
| JP | A-9-191508 | 7/1997 |
| JP | A-2000-102257 | 4/2000 |
| JP | A-2002-272125 | 9/2002 |
| JP | A-2003-204028 | 7/2003 |
| JP | A-2004-48885 | 2/2004 |
| WO | WO 97/25766 A1 | 7/1997 |

* cited by examiner

100

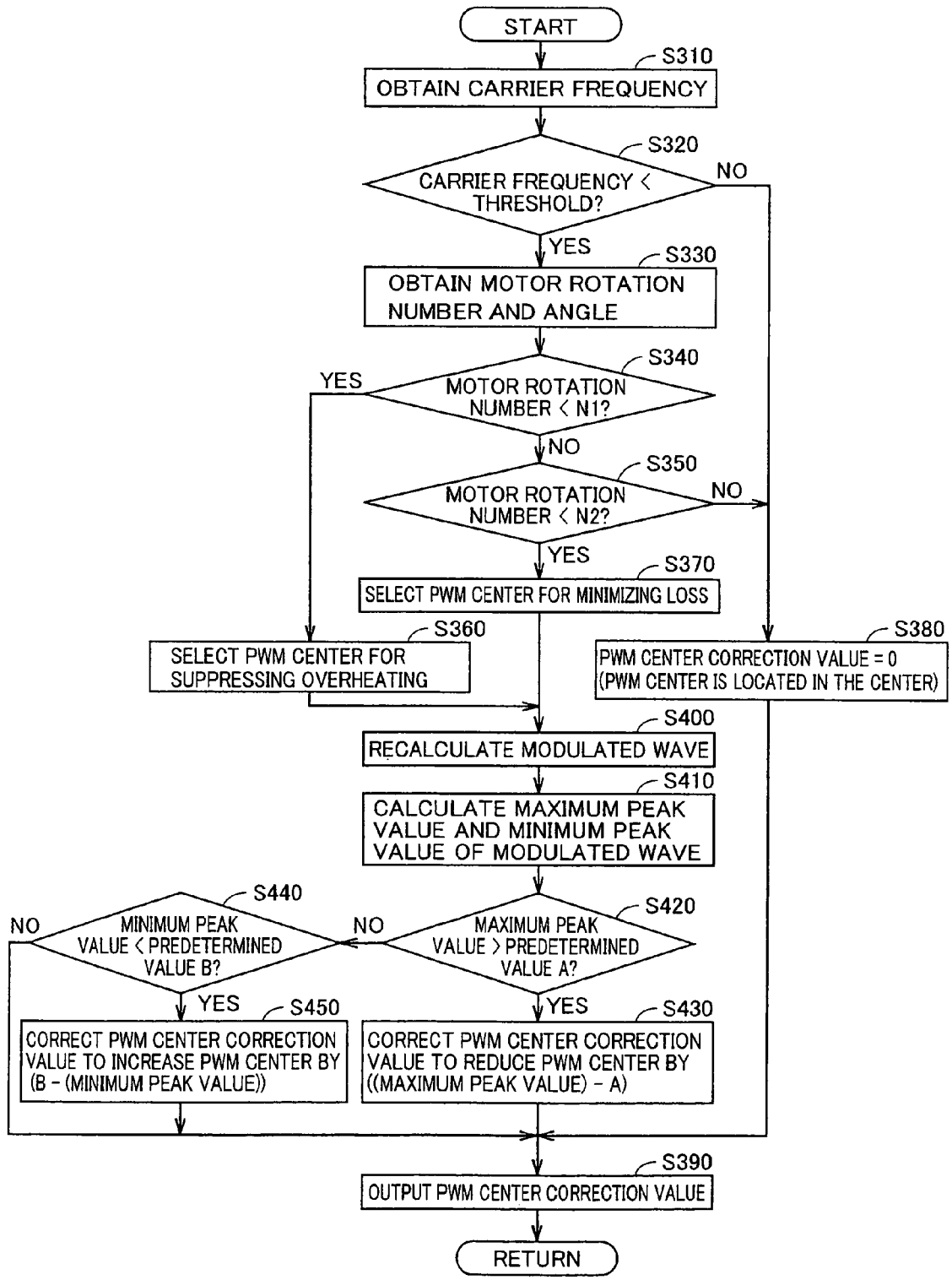

CONTROL DEVICE FOR ELECTRIC-POWERED VEHICLE, AND ELECTRIC-POWERED VEHICLE WITH CONTROL DEVICE AS WELL AS CONTROL METHOD FOR ELECTRIC-POWERED VEHICLE, AND COMPUTER-READABLE RECORDING MEDIUM BEARING PROGRAM FOR CAUSING COMPUTER TO EXECUTE CONTROL METHOD

TECHNICAL FIELD

The present invention relates to a control technique of an electric-powered vehicle that is equipped with an AC (alternate current) motor as a motive power source for vehicle running.

BACKGROUND ART

In recent years, attention has been given to electric-powered vehicles such as electric vehicles, hybrid vehicles and fuel cell vehicles against the background of environmental issues. These electric-powered vehicles are equipped with an AC motor driven by an inverter as a motive power source for vehicle running.

In these electric-powered vehicles, when a drive torque balances a vehicle weight, e.g., during slope climbing and thus the vehicle enters a so-called "motor lock state" in which the AC motor attains an extremely low motor rotation number while outputting a motor torque, a current concentratedly flows in a specific phase so that a loss increases in the inverter, and the inverter may overheats within a short time.

Accordingly, Japanese Patent Laying-Open No. 2002-272125 (patent document 1) has disclosed a control device that can reduce a loss in a switching element forming an electric converter when a frequency of an AC voltage reference is equal to a predetermined value or less. This control device performs PWM (Pulse Width Modulation) control on a power semiconductor element that forms an electric power converter. When the frequency of the AC voltage reference is equal to the predetermined value or less, the control device adds a DC (direct current) offset voltage to the AC voltage reference, and thereby reduces a loss in the power semiconductor element.

This control device can reduce the loss in the power semiconductor element when the AC low-frequency power is being supplied (see Patent Document 1).
Patent Document 1: Japanese Patent Laying-Open No. 2002-272125
Patent Document 2: Japanese Patent Laying-Open No. 9-191508
Patent Document 3: Japanese Patent Laying-Open No. 2000-102257
Patent Document 4: Japanese Patent Laying-Open No. 6-245577
Patent Document 5: Japanese Patent Laying-Open No. 2004-48885
Patent Document 6: Japanese Patent Laying-Open No. 2003-204028

DISCLOSURE OF THE INVENTION

Problems to be Solved by the Invention

A loss in an inverter consists of a switching loss that occurs when a switching element is turned on/off, and an on loss that occurs when the switching element is on. A method disclosed in the above Japanese Patent Laying-Open No. 2002-272125 is focused on only the on loss of the switching element, and may be ineffective when consideration is given to a total loss including the switching loss.

Accordingly, an object of the invention is to provide a control device for an electric-powered vehicle that can effectively reduce a loss in an inverter as well as an electric-powered vehicle provided with the control device.

Another object of the invention is to provide a control method for an electric-powered vehicle that can effectively reduce a loss in an inverter as well as a computer-readable recording medium bearing a program for causing a computer to execute the control method.

Means for Solving the Problems

According to the invention, a control device for an electric-powered vehicle is equipped with an AC motor as a motive power source for vehicle running, and includes an inverter, a signal producing unit and a control unit. An inverter drives the AC motor. The signal producing unit produces a signal for turning on/off a switching element of the inverter based on a pulse width modulation method. The control unit is configured to reduce a loss of the inverter by variably controlling a central value of a modulated wave used in the signal producing unit when a switching frequency of the inverter is lower than a predetermined frequency.

Preferably, the predetermined frequency is set based on a region of the switching frequency in which an on loss of the inverter is relatively greater than a switching loss of the inverter.

Preferably, the control unit is configured to suppress current concentration in the inverter by variably controlling a central value of the modulated wave when the switching frequency of the inverter is lower than the predetermined frequency, and a rotation number of the AC motor is lower than a predetermined rotation number.

Further preferably, the control device for the electric-powered vehicle further includes a current sensing unit. The current sensing unit senses an each phase current of the AC motor. The control unit changes the central value of the modulated wave to become smaller than a central value of a carrier used in the signal producing unit when a current flows from the inverter to the AC motor in a phase greatest in current, and changes the central value of the modulated wave to become larger than the central value of the carrier when the current flows from the AC motor to the inverter in the phase greatest in current.

Further preferably, the control unit changes the central value of the modulated wave to a preobtained value to keep a balance among on losses of the respective phases of the inverter.

Preferably, the control unit changes the central value of the modulated wave such that a switching operation of a phase greatest in current stops and a modulation control by another phase is performed in response to the fact that the modulated wave of the phase of the maximum current attains a predetermined maximum value or a predetermined minimum value.

Preferably, the control device for the electric-powered vehicle further includes a temperature sensing unit. The temperature sensing unit senses an element temperature of the inverter. The control unit changes the central value of the modulated wave to become smaller than a central value of a carrier used in the signal producing unit when a current flows from the inverter to the AC motor in a phase highest in element temperature. Also, the control unit changes the central value of the modulated wave to become larger than the central value of the carrier when the current flows from the AC motor to the inverter in the phase highest in temperature.

Preferably, the control device for the electric-powered vehicle further includes a temperature sensing unit and a phase angle changing unit. The temperature sensing unit senses an element temperature of the inverter. The phase angle changing unit changes a phase angle of the modulated wave to reduce a value of the current flowing in a phase highest in element temperature.

Further preferably, the phase angle changing unit changes the phase angle of the modulated wave to make the current value substantially equal to zero.

Preferably, the control unit variably controls the central value of the modulated wave to attain values preobtained for the respective phases of the modulated wave for minimizing a total loss of the inverter when the rotation number of the AC motor is equal to the predetermined rotation number or more.

Further preferably, when a peak of the modulated wave exceeds a peak of a carrier as a result of changing the central value of the modulated wave, the control unit corrects the central value of the modulated wave such that the peak of the modulated wave becomes smaller than the peak of the carrier.

Further, according to the invention, an electric-powered vehicle includes an AC motor generating a drive power of the vehicle; a wheel coupled to an output shaft of the AC motor; and one of the control devices described above.

Further, the invention provides a control method for an electric-powered vehicle that is equipped with an AC motor as a motive power source for vehicle running, and the control method includes first and second steps. The first step produces a signal for turning on/off a switching element of an inverter driving the AC motor, based on a pulse width modulation method. The second step reduces a loss of the inverter by variably controlling a central value of a modulated wave used for production of the signal when a switching frequency of the inverter is lower than a predetermined frequency.

Preferably, the predetermined frequency is set based on a region of the switching frequency in which an on loss of the inverter is relatively greater than a switching loss of the inverter.

Preferably, in the second step, current concentration in the inverter is suppressed by variably controlling the central value of the modulated wave when the switching frequency of the inverter is lower than the predetermined frequency, and a rotation number of the AC motor is lower than a predetermined rotation number.

Further preferably, in the second step, the central value of the modulated wave is changed to become smaller than a central value of a carrier used for production of the signal when a current flows from the inverter to the AC motor in a phase greatest in current. Also, in the second step, the central value of the modulated wave is changed to become larger than the central value of the carrier when the current flows from the AC motor to the inverter in the phase greatest in current.

Further preferably, in the second step, the central value of the modulated wave is changed to a preobtained value to keep a balance among on losses of the respective phases of the inverter.

Preferably, in the second step, the central value of the modulated wave is changed such that a switching operation of a phase greatest in current stops and a modulation control by another phase is performed in response to the fact that the modulated wave of the phase of the maximum current attains a predetermined maximum value or a predetermined minimum value.

Preferably, in the second step, the central value of the modulated wave is changed to become smaller than a central value of a carrier used for producing the signal when a current flows from the inverter to the AC motor in a phase highest in element temperature of the inverter. Also, in the second step, the central value of the modulated wave is changed to become larger than the central value of the carrier when the current flows from the AC motor to the inverter in the phase highest in temperature.

Preferably, the control method for the electric-powered vehicle further includes a third step. In the third step, a phase angle of the modulated wave is changed to reduce a value of the current flowing in a phase highest in element temperature of the inverter.

Further preferably, in the third step, the phase angle of the modulated wave is changed to make the current value substantially equal to zero.

Preferably, the control method for the electric-powered vehicle further includes a fourth step. In the fourth step, the central value of the modulated wave is variably controlled to attain values preobtained for the respective phases of the modulated wave to minimize a total loss of the inverter when the rotation number of the AC motor is equal to the predetermined rotation number or more.

Further preferably, the control method for the electric-powered vehicle further includes fifth and sixth steps. In the fifth step, it is determined whether a peak of the modulated wave exceeds a peak of a carrier as a result of changing the central value of the modulated wave, or not. The sixth embodiment corrects the central value of the modulated wave such that the peak of the modulated wave becomes smaller than the peak of the carrier when it is determined that the peak of the modulated wave exceeds the peak of the carrier.

Further, according to the invention, a recording medium is a computer-readable recording medium bearing a program for causing a computer to execute one of the control methods for the electric-powered vehicle described above.

Effects of the Invention

In this invention, the PWM control is performed on the inverter based on the pulse width modulation method. The loss of the inverter consists of the switching loss and the on loss. When the switching frequency of the inverter is low, the on loss is predominant, and a ratio of the switching loss will increases as the switching frequency rises. In this invention, when the switching frequency of the inverter is lower than the predetermined frequency, i.e., in the state of the low switching frequency making the on loss predominant, the central value of the modulated wave used in the signal producing unit is variably controlled so that the on loss of the inverter is reduced. According to the invention, therefore, the loss of the inverter can be effectively reduced.

Further, according to the invention, when the switching frequency of the inverter is lower than the predetermined frequency and the rotation number of the AC motor is lower than the predetermined rotation number (when the motor lock state is sensed), i.e., in the state where the total loss of the inverter is relatively small owing to the small switching loss, but thermally severe conditions are caused by concentration of the current in a specific phase due to the low motor rotation number, the on loss is reduced by variably controlling the central value of the modulated wave, and thereby the current concentration in the inverter is suppressed. Therefore, the invention suppresses the concentrated flowing of the current in a specific element. Consequently, overheating and damages of the inverter can be prevented.

BRIEF DESCRIPTION OF THE DRAWINGS

FIG. 5 shows a current and voltages appearing when a transistor of a U-phase upper arm is on.

FIG. 6 shows a current and voltages appearing when a transistor of a U-phase lower arm is on.

FIG. 32 is a flowchart illustrating a control structure of the PWM center unit in a ninth embodiment.

DESCRIPTION OF THE REFERENCE SIGNS

10 inverter, 12 U-phase arm, 14 V-phase arm, 16 W-phase arm, 20 and 20A-20D ECU, 22 voltage sensor, 24 current sensor, 26 rotation angle sensor, 31-36, 41-46 temperature sensor, 52 current command producing unit, 54 and 60 coordinate converting unit, 56-1 and 56-2 subtractor, 58-1 and 58-2 PI control unit, 62 rotation number calculating unit, 64 carrier frequency setting unit, 66 and 66A-66E PWM center control unit, 68 PWM signal producing unit, 70 phase angle changing unit, 72 adder, 100, 100A and 100B electric-powered vehicle, B power storage device, PL positive line, NL negative line, C capacitor, Q1-Q6 transistor, D1-D6 diode, UL U-phase line, VL V-phase line, WL W-phase line, MG motor generator, DW wheel

BEST MODES FOR CARRYING OUT THE INVENTION

Embodiments of the invention will now be described with reference to the drawings. In the following description, the same or corresponding portions bear the same reference numbers, and description thereof is not repeated.

First Embodiment

Figure 1:
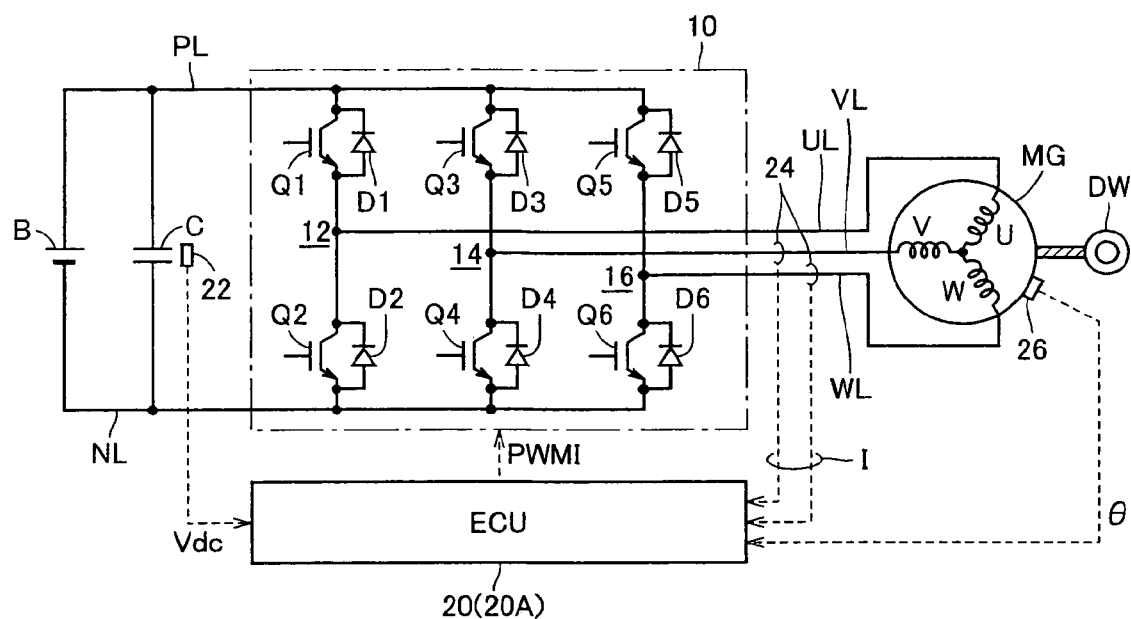
FIG. 1 shows a power train structure of an electric-powered vehicle according to a first embodiment of the invention.

FIG. 1 shows a power train structure of an electric-powered vehicle according to a first embodiment of the invention. Referring to FIG. 1, an electric-powered vehicle 100 includes a power storage device B, an inverter 10, an Electronic Control Unit (ECU) 20, a motor generator MG and wheels DW. Also, electric-powered vehicle 100 includes a positive line PL, a negative line NL, a capacitor C, and U-, V- and W-phase lines UL, VL and WL. Further, electric-powered vehicle 100 includes a voltage sensor 22, a current sensor 24 and a rotation angle sensor 26.

Positive and negative terminals of power storage device B are connected to positive and negative lines PL and NL, respectively. Capacitor C is connected between positive and negative lines PL and NL. Inverter 10 includes U-, V- and W-phase arms 12, 14 and 16, which are connected, in parallel, between positive and negative lines PL and NL. U-phase arm 12 is formed of transistors Q1 and Q2 connected together in series, V-phase arm 14 is formed of transistors Q3 and Q4 connected together in series, and W-phase arm 16 is formed of transistors Q5 and Q6 connected together in series. Diodes D1-D6 are connected in anti-parallel to transistors Q1-Q6, respectively.

For example, the above transistor may be an IGBT (Insulated Gate Bipolar Transistor). Also, the above transistor may be a switching element such as a power MOSFET (Metal Oxide Semiconductor Field-Effect Transistor).

Motor generator MG includes U-, V- and W-phase coils U, V and W as stator coils. U-, V- and W-phase coils U, V and W are connected to connection nodes between upper and lower arms of U-, V- and W-phase arms 12, 14 and 16, respectively. The rotation shaft of motor generator MG is coupled to wheels DW.

Power storage device B is a rechargeable DC power supply, and is formed of a secondary battery such as a nickel hydrogen battery or a lithium-ion battery. Power storage device B supplies a DC power to inverter 10. Power storage device B is charged with an electric power that is regeneratively generated by motor generator MG during braking of the vehicle and is supplied from inverter 10. Power storage device B may be formed of a capacitor of a large capacity.

Capacitor C smoothes variations in voltage between positive and negative lines PL and NL. Voltage sensor 22 senses a voltage across terminals of capacitor C, i.e., a voltage Vdc on positive line PL with respect to negative line NL, and provides a sensed value to ECU 20.

Based on a signal PWMI from ECU 20, inverter 10 converts the DC voltage supplied from power storage device B to a three-phase AC voltage to drive motor generator MG. During braking of the vehicle, inverter 10 converts the three-phase AC voltage, which is generated by motor generator MG receiving a rotation force from wheels DW, to a DC voltage based on signal PWMI supplied from ECU 20, and provides the converted DC voltage to power storage device B.

Motor generator MG is a three-phase AC electric motor, and is formed of, e.g., a three-phase AC synchronous motor having permanent magnets embedded in a rotor. Motor generator MG is driven for power running by inverter 10 to generate the drive power for driving wheels DW. Also, motor generator MG is regeneratively driven by inverter 10 during the regenerative braking of the vehicle, generates the three-phase AC voltage from the rotation power supplied from wheels DW, and provides it to inverter 10.

Current sensor 24 senses an each phase motor current, i.e., a motor current of each phase, and provides a sensed value to ECU 20. In FIG. 1, current sensor 24 senses the currents of V- and W-phase lines VL and WL. The current of U-phase current UL can be calculated using Kirchhoff's law. Rotation angle sensor 26 senses a rotation angle θ of the rotor of motor generator MG, and provides a sensed value to ECU 20.

Based on voltage Vdc from voltage sensor 22, a motor current I from current sensor 24 and motor rotation angle θ from rotation angle sensor 26, ECU 20 produces signal PWMI for driving inverter 10 by a method to be described later, and provides signal PWMI thus produced to transistors Q1-Q6 of inverter 10.

Figure 2:
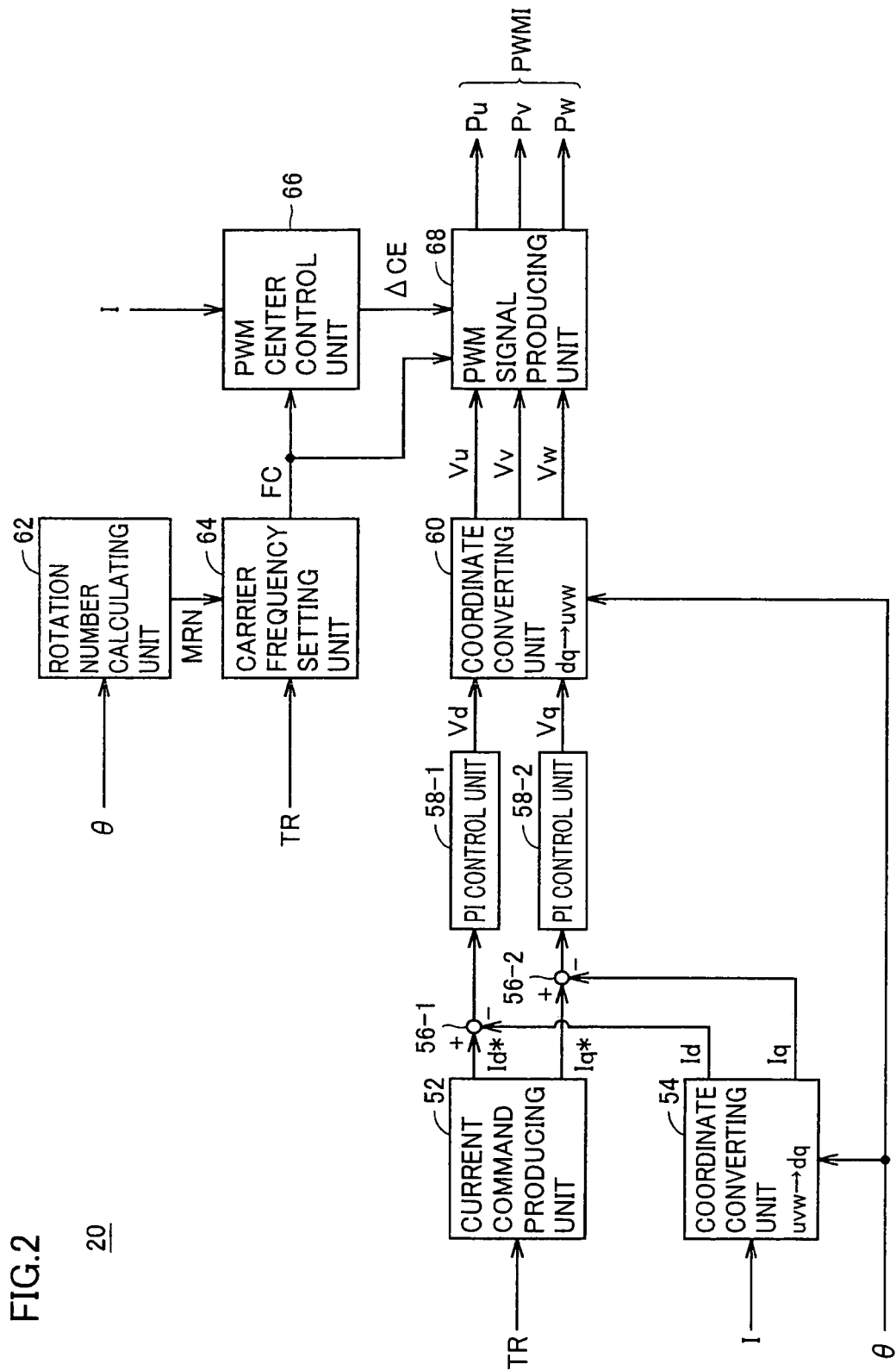
FIG. 2 is a functional block diagram of an ECU shown in FIG. 1.

FIG. 2 is a functional block diagram of ECU 20 shown in FIG. 1. Referring to FIG. 2, ECU 20 includes a current command producing unit 52, coordinate converting units 54 and 60, subtractors 56-1 and 56-2, PI control units 58-1 and 58-2, a rotation number calculating unit 62, a carrier frequency setting unit 64, a PWM center control unit 66 and a PWM signal producing unit 68.

Current command producing unit 52 produces a d-axis current command Id* and a q-axis current command Iq* based on a torque command TR of motor generator MG. Coordinate converting unit 54 converts motor current I sensed by current sensor 24 to d- and q-axis currents Id and Iq, using motor rotation angle θ provided from rotation angle sensor 26. Subtractor 56-1 subtracts d-axis current Id from d-axis current command Id*, and provides a result of the calculation to PI control unit 58-1. Subtractor 56-2 subtracts q-axis current Iq from q-axis current command Iq*, and provides a result of the calculation to PI control unit 58-2.

PI control unit 58-1 performs a proportional integral operation based on the output of subtractor 56-1 and provides, as d-axis voltage command Vd, a result of the operation to coordinate converting unit 60. PI control unit 58-2 performs a proportional integral operation based on the output of subtractor 56-2 and provides, as a q-axis voltage command Vq, a result of the operation to coordinate converting unit 60.

Using motor rotation angle θ, coordinate converting unit 60 converts d- and q-axis voltage commands Vd and Vq provided from PI control units 58-1 and 58-2, respectively, to U-, V- and W-phase voltage commands Vu, Vv and Vw, and outputs these phase voltage commands thus converted to PWM signal producing unit 68.

Revolution speed calculating unit 62 calculates motor rotation number MRN based on motor rotation angle θ, and provides a calculated value to carrier frequency setting unit 64.

Carrier frequency setting unit 64 sets a frequency (carrier frequency FC) of a carrier used for producing the PWM signal, based on torque command TR and motor rotation number MRN of motor generator MG, and provides carrier frequency FC thus set to PWM center control unit 66 and PWM signal producing unit 68.

In a method that will be described later, PWM center control unit 66 produces, based on carrier frequency FC and motor current I, a PWM center correction value ΔCE for variably controlling a central value (which may also be referred to as a "PWM center" hereinafter) of each phase modulated wave (i.e., each of respective phase modulated waves) in PWM signal producing unit 68, and provides PWM center correction value ΔCE thus produced to PWM signal producing unit 68.

PWM signal producing unit 68 produces respective phase PWM signals Pu, Pv and PW (i.e., PWM signals of respective phases) by the pulse width modulation method based on respective phase voltage commands Vu, Vv and Vw and provides, as signal PWMI, these PWM signals Pu, Pv and PW thus produced to inverter 10. More specifically, PWM signal producing unit 68 produces the respective phase modulated waves corresponding to respective phase voltage commands Vu, Vv and Vw. PWM signal producing unit 68 produces from its signal issuing unit (not show) a carrier that has carrier frequency FC set by carrier frequency setting unit 64. PWM signal producing unit 68 produces respective PWM signals Pu, Pv and Pw according to a relationship in magnitude between the respective phase modulated waves and the carrier.

The general PWM control produces a modulated wave of which a central value (PWM center) becomes a central value of a carrier. PWM signal producing unit 68 changes the PWM center, using PWM center correction value ΔCE provided from PWM center control unit 66. More specifically, PWM signal producing unit 68 changes the PWM center by uniformly adding PWM center correction value ΔCE to each phase modulated wave. PWM signal producing unit 68 compares each phase modulated wave having the PWM center changed by PWM center correction value ΔCE with the carrier, and produces respective phase PWM signals Pu, Pv and Pw based on a result of the comparison.

In the following description, it is assumed that the carrier is a triangular wave having a frequency from several kilohertz to about 10 kilohertz. Therefore, the carrier has the central value of 0.5.

Figure 3:
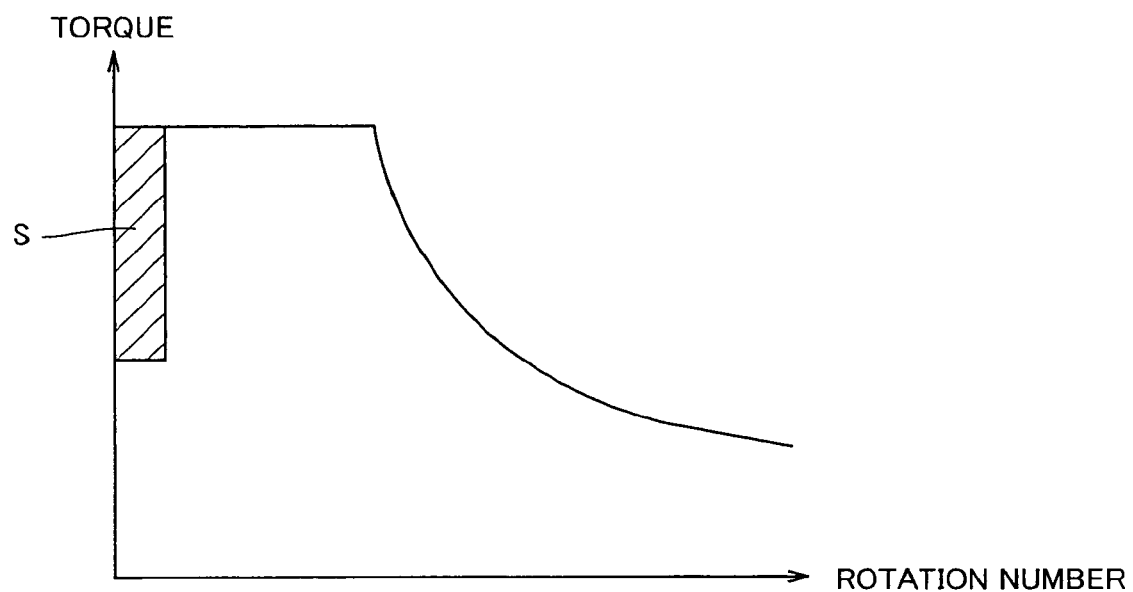
FIG. 3 illustrates a carrier frequency set by a carrier frequency setting unit shown in FIG. 2.

FIG. 3 illustrates carrier frequency FC set by carrier frequency setting unit 64 shown in FIG. 2. Referring to FIG. 3, the abscissa gives motor rotation number MRN, and the ordinate gives torque command TR. Carrier frequency FC is set relatively low in a region S where motor rotation number MRN is low and torque command TR is not small, and will be set higher with increase in motor rotation number MRN.

For the following reason, carrier frequency FC is set low in region S of the low rotation number and not-small torque. When the torque is large, the current is large and therefore the on loss of the switching element is large so that the loss in the inverter is large in the region of the large torque. As the motor rotation number decreases, the quantity of current concentratedly flowing through each phase arm increases so that thermal conditions become more severe. Conversely, as the carrier frequency lowers, the switching loss decreases so that the total loss decreases. For suppressing the loss in the inverter according to the motor rotation and torque, it is effective to lower the carrier frequency in the not-small torque region within the low rotation range. It is noted that the carrier frequency is set high in the high rotation range for the purpose of suppressing electromagnet noises due to operations of the switching elements.

Figure 4:
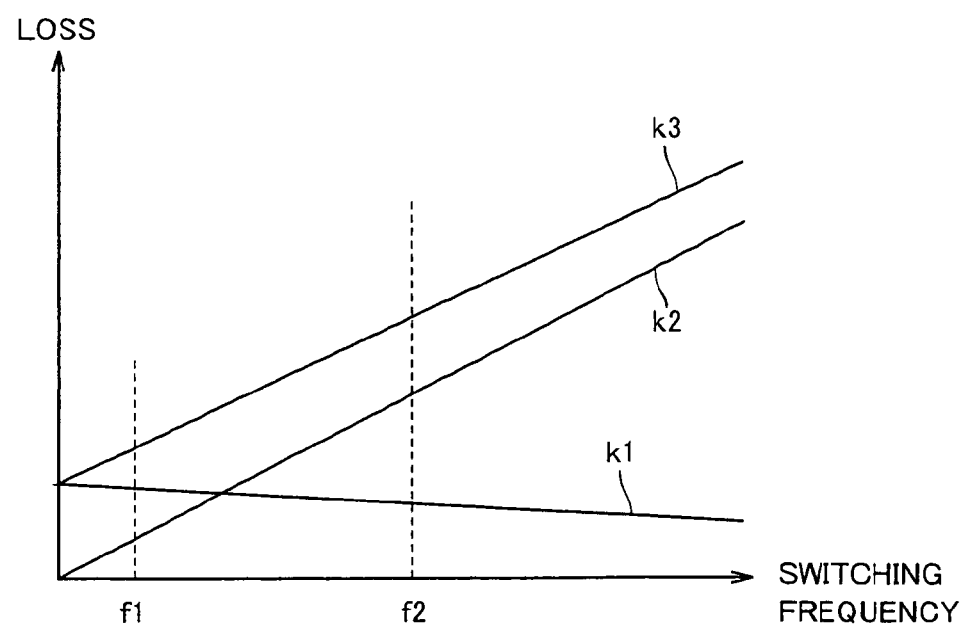
FIG. 4 shows a relationship between a switching frequency and a loss in an inverter.

FIG. 4 shows a relationship between a switching frequency and the loss in the inverter. Referring to FIG. 4, the abscissa gives the switching frequency (corresponding to the carrier frequency) of the inverter, and the ordinate gives the loss. Line k1 represents an on loss that occurs when the switching element forming the inverter is on. Line k2 represents the switching loss that occurs when the switching element is turned on and off. Line k3 represents the total loss that is a sum of the on loss and the switching loss.

In the region of a low switching frequency, the on loss is larger than the switching loss, and the on loss becomes predominant. The switching loss increases with increase in switching frequency, and becomes predominant in the region of a middle or high switching frequency.

In the low frequency region where the on loss is predominant, the absolute value of the total loss is smaller than that in the middle or high frequency region. However, the rotation number of the motor is low, and particularly the rotation number becomes extremely low due to the motor lock or the like so that the current concentrates in a specific phase, and therefore thermally severe conditions may occur. Thus, in the region of the low motor rotation number, the carrier frequency is set low for suppressing the loss in the inverter as shown in FIG. 3. Nevertheless, in certain conditions (e.g., the motor lock), the current concentrates in a specific phase to cause thermally severe conditions. It is noted that, in the middle or high frequency region where the total loss is relatively large, the motor continues rotation so that the current is dispersed to the different phases every short time, and the thermal conditions are less severe than those in the low frequency region.

As described below, the first embodiment is configured to avoid the thermally severe conditions by variably controlling the PWM center in the low switching frequency region where the on loss is predominant.

Description will now be given on a principle of reducing the loss by operating the PWM center.

Figure 5:
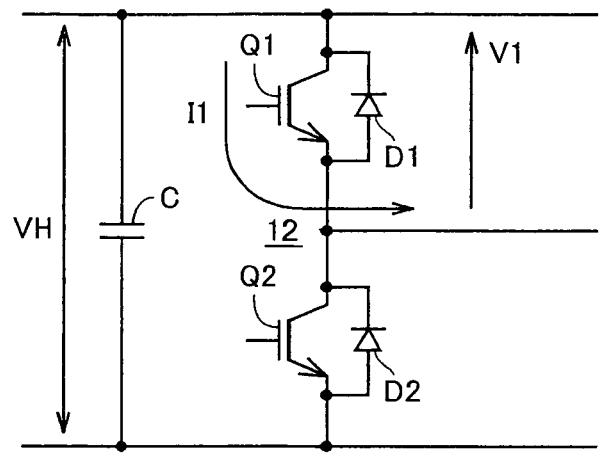
Figure 6:
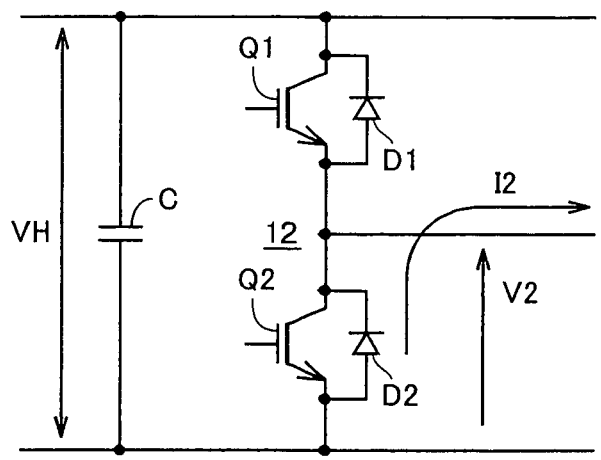
Figure 7:
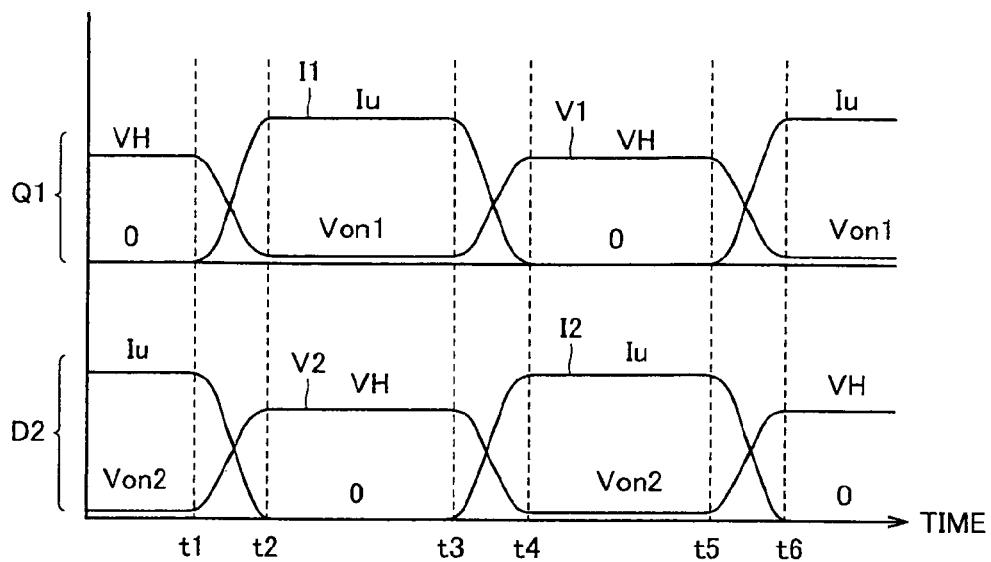
FIG. 7 is a waveform showing the current and voltages shown in FIGS. 5 and 6.

FIGS. 5 to 7 illustrate currents and voltages in the inverter. FIG. 5 shows a current and voltages appearing when transistor Q1 of the U-phase upper arm is on. FIG. 6 shows a current and voltages appearing when transistor Q2 of the U-phase lower arm is on. FIG. 7 is a waveform diagram showing the current and voltages shown in FIGS. 5 and 6. FIGS. 5 to 7 representatively illustrate the case where the current flows from U-phase arm 12 to motor generator MG (and the current flowing in this state is assigned a positive sign). However, The same is true with respect to the case where a current flows from motor generator MG to U-phase arm 12 (i.e., a negative current flow) as well as other cases.

Referring to FIGS. 5 to 7, transistor Q1 of the upper arm is on (and transistor Q2 of the lower arm is off) between times t2 and t3, and after time t6 in FIG. 7. In this state, a current Iu flows through transistor Q1, an on voltage Von1 is placed on transistor Q1 and a voltage VH is placed on the lower arm.

Transistor Q2 of the lower arm is on (and transistor Q1 of the upper arm is off) before time t1 and between times t4 and t5 in FIG. 7. In this state, current Iu flows through diode D2 of the lower arm, an on voltage Von2 is placed on diode D2 and voltage VH is placed on the upper arm.

Periods of times t1-t2, t3-t4 and t5-t6 are switching periods of transistors Q1 and Q2.

Assuming that a switching frequency is K (Hz), a loss ΔLQ1 per unit time of transistor Q1 and a loss ΔLD2 per unit time of diode D2 are expressed by the following equation:

$$\Delta LQ1 = 2 \times K \times \int (V1 \times Iu) dt + (1/K - 2 \times dt) \times K \times \int (Von1 \times Iu) dt \quad (1)$$

$$\Delta LD2 = 2 \times K \times \int (V2 \times Iu) dt + (1/K - 2 \times dt) \times K \times \int (Von2 \times Iu) dt \quad (2)$$

wherein the first term in the right side of each of the equations (1) and (2) represents the switching loss, and the second term in the right side represents the on loss.

As can be seen from the equations (1) and (2), loss ΔLQ1 of transistor Q1 and loss ΔLD2 of diode D2 are expressed by the equations of the same structure, and take different values depending on the switching characteristics and the on voltages, respectively. According to each of the equations (1) and (2), the loss can be illustrated by FIG. 4 in which the abscissa gives a switching frequency K.

Figure 8:
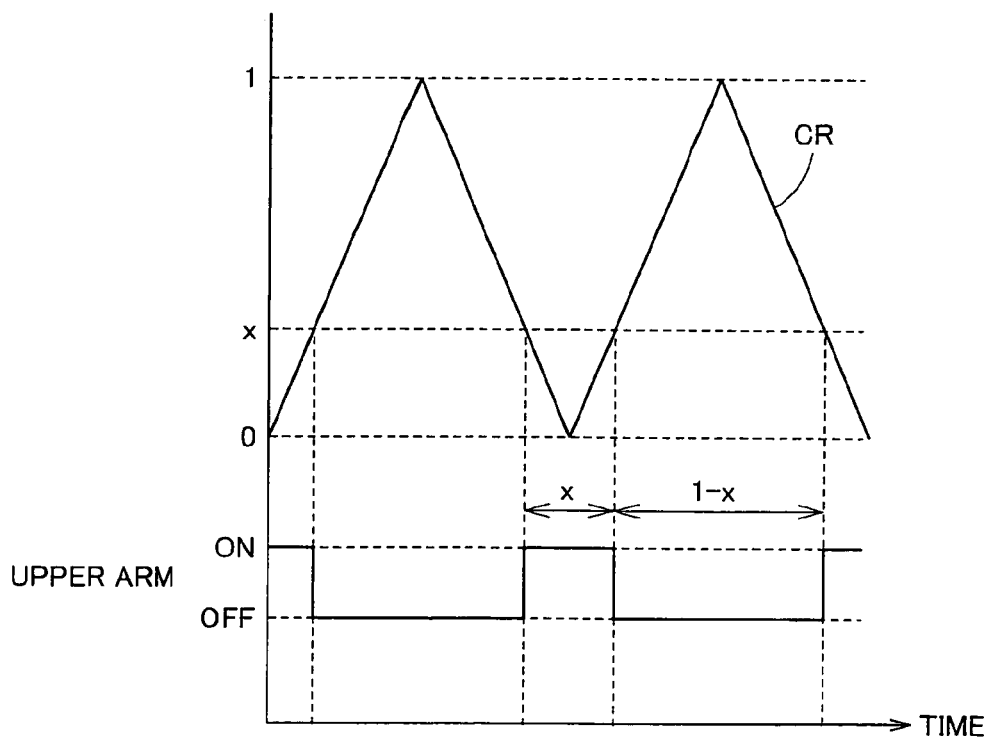
FIG. 8 illustrates an example of an idea about an operation of a PWM center.

FIG. 8 illustrates an example of an idea about the PWM center operation. Referring to FIG. 8, when the PWM center is x ($0 \le x < 1$), the on duty of transistor Q1 is expressed by x. In this case, an on loss ΔLQ ion of transistor Q1 and an on loss ΔLD2on of diode D2 in one cycle are expressed by the following equations:

$$\Delta LQ1 \text{on} = Von1 \times Iu \times x \quad (3)$$

$$\Delta LD2 \text{on} = Von2 \times Iu \times (1-x) \quad (4)$$

Figure 9:
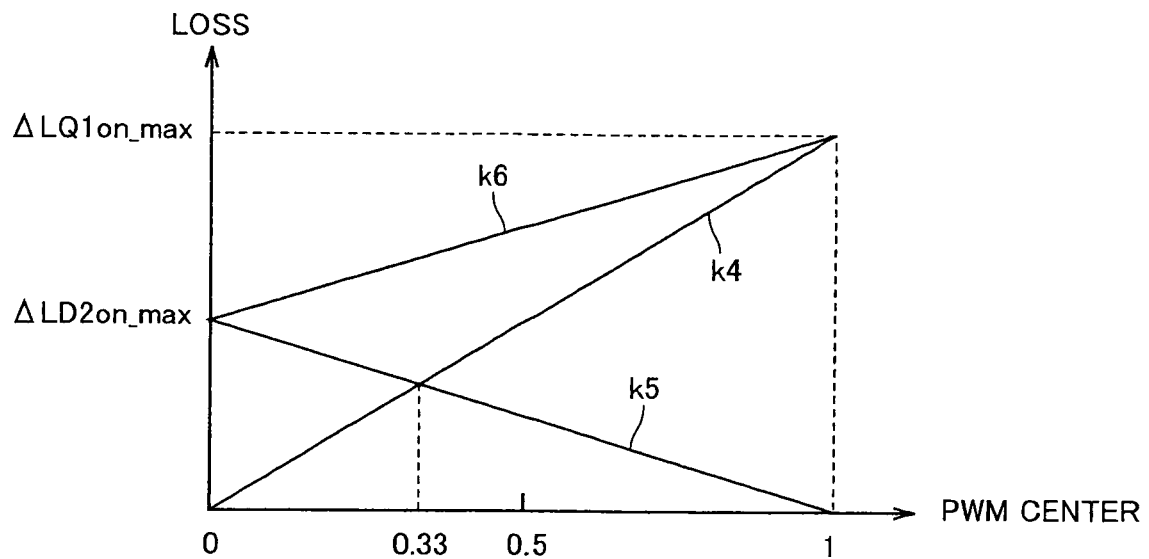
FIG. 9 shows a relationship between the PWM center and an on loss.

FIG. 9 shows a relationship between the PWM center and the on loss. Referring to FIG. 9, line k4 represents on loss ΔLQ1on of transistor Q1, and line k5 represents on loss ΔLD2on of diode D2. Line k6 represents a sum of on losses ΔLQ1on and ΔLD2on.

When the PWM center increases, on loss ΔLQ1on of transistor Q1 increases. When the PWM center takes the maximum value of 1, on loss ΔLQ1on takes the maximum value ΔLQ1on_max (=Von1×Iu). When the PWM center decreases, on loss ΔLD2on of diode D2 increases. When the PWM center takes the minimum value of 0, on loss ΔLD2on takes the maximum value ΔLD2on_max (=Von2×Iu).

It is assumed that a ratio between on voltage Von1 of transistor Q1 and on voltage Von2 of diode D2 is 2:1. When on loss ΔLQ1on of transistor Q1 is equal to on loss ΔLD2on of diode D2, x=0.33 is obtained from the equations (3) and (4). Therefore, when the ratio between on voltage Von1 of transistor Q1 and on voltage Von2 of diode D2 is 2:1, the PWM center can be shifted from 0.5 (central value) to 0.33 so that the heating of transistor Q1 can be balanced with that of diode D2, and the overheating of transistor Q1 that is in thermally severe conditions can be prevented.

Figure 10:
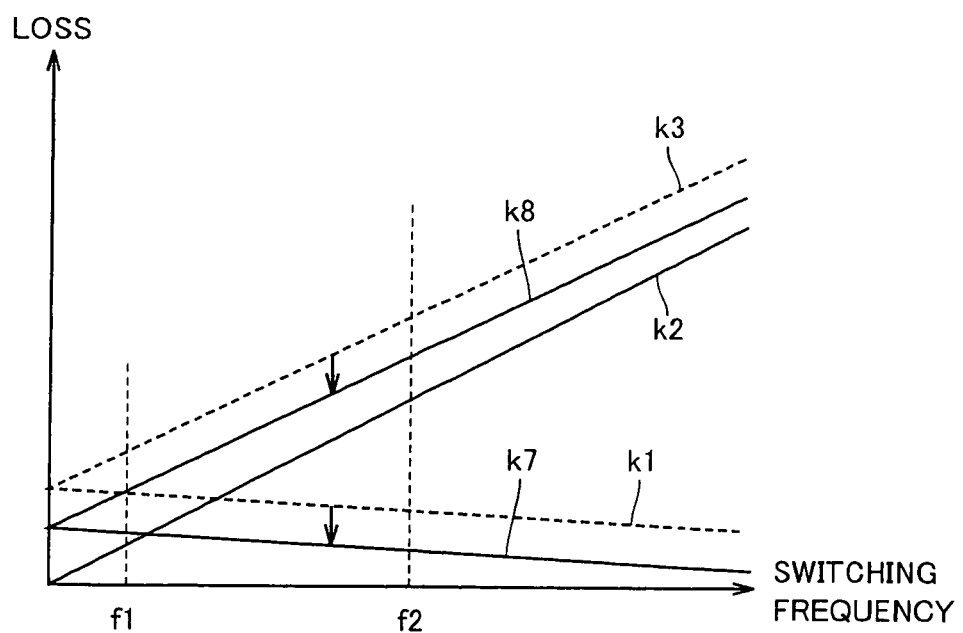
FIG. 10 shows a relationship between a switching frequency and an inverter loss at the time of operating the PWM center.

FIG. 10 shows a relationship between a switching frequency and an inverter loss at the time of operating the PWM center. Referring to FIG. 10, lines k1-k3 are the same as those in FIG. 4. Line k7 represents the on loss at the time of operating the PWM center. Line k8 represents the total loss of the on loss and the switching loss at the time of operating the PWM center.

As can be seen from FIG. 10, the effect of reducing the loss by the PWM center operation becomes large in the low switching frequency region where the on loss is predominant. In other words, when the switching frequency is in the middle or high frequency region, the effect of reducing the loss by the PWM center operation is small. Therefore, the first embodiment is configured to perform the variable control on the PWM center in the low switching frequency region where the on loss is predominant, and thereby avoid the thermally severe conditions.

The description has been described in connection with the case where the current flows from U-phase arm 12 to motor generator MG (i.e., the current is positive). However, the same is true with respect to the case where the current flows from motor generator MG to U-phase arm 12 (i.e., the current is negative). In this case, current Iu (negative) flows in transistor Q2 when transistor Q2 of the lower arm is on, and current Iu (negative) flows in diode D1 when transistor Q1 of the upper arm is on. Assuming that the ratio between the on voltages of transistor Q2 and diode D1 is 2:1, PWM center x becomes equal to 0.67. Therefore, when the current flows from motor generator MG to U-phase arm 12, the heat generation of transistor Q2 can be balanced with that of diode D1 by shifting the PWM center from 0.5 (central value) to 0.67, and thereby the overheating of transistor Q2 in the thermally severe conditions can be prevented.

Figure 11:
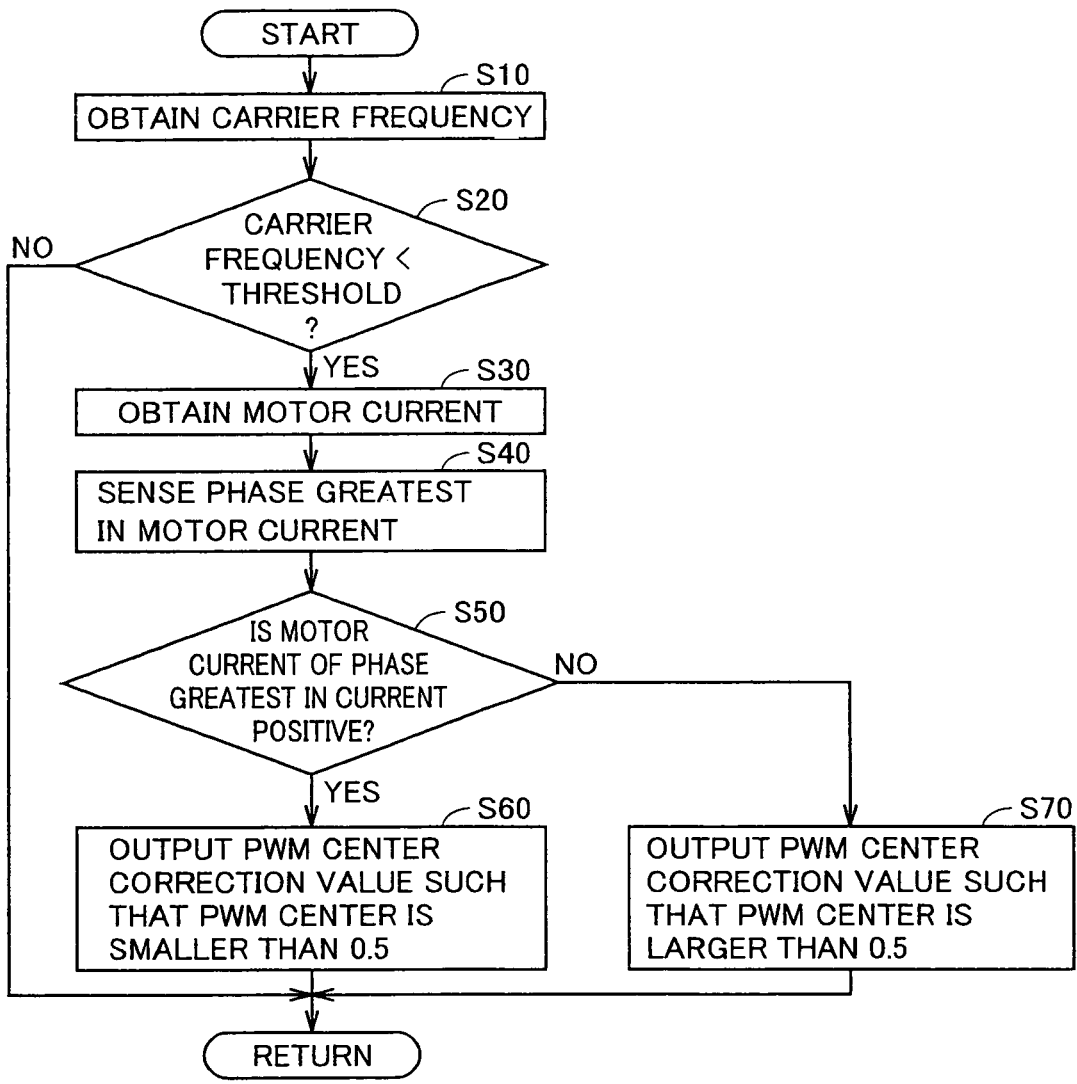
FIG. 11 is a flowchart illustrating a control structure of the PWM center control unit shown in FIG. 2.

FIG. 11 is a flowchart illustrating a control structure of PWM center control unit 66 shown in FIG. 2. The processing shown in this flowchart is called from a main routine for execution at intervals of a predetermined time or when predetermined conditions are satisfied.

Referring to FIG. 11, PWM center control unit 66 obtains carrier frequency FC from carrier frequency setting unit 64 (step S10). PWM center control unit 66 determines whether carrier frequency FC is lower than a predetermined threshold or not (step S20). This threshold can be obtained in advance by an off-line experiment or the like based on thermal design of each switching element of the inverter.

When it is determined that carrier frequency FC is lower than threshold (YES in step S20), PWM center control unit 66 obtains motor current I (step S30), and senses the phase greatest in magnitude of the motor current (step S40). Then, PWM center control unit 66 determines whether the motor current of the phase greatest in current is positive or not (step S50).

When it is determined that the motor current of the phase greatest in current is positive (YES in step S50), PWM center control unit 66 produces PWM center correction value ΔCE such that the PWM center is smaller than 0.5 (the central value of the carrier), and provides it to PWM signal producing unit 68 (step S60).

When it is determined that the motor current of the phase greatest in current is negative (NO in step S50), PWM center control unit 66 produces PWM center correction value ΔCE such that the PWM center is larger than 0.5, and provides it to PWM signal producing unit 68 (step S70).

Figure 12:
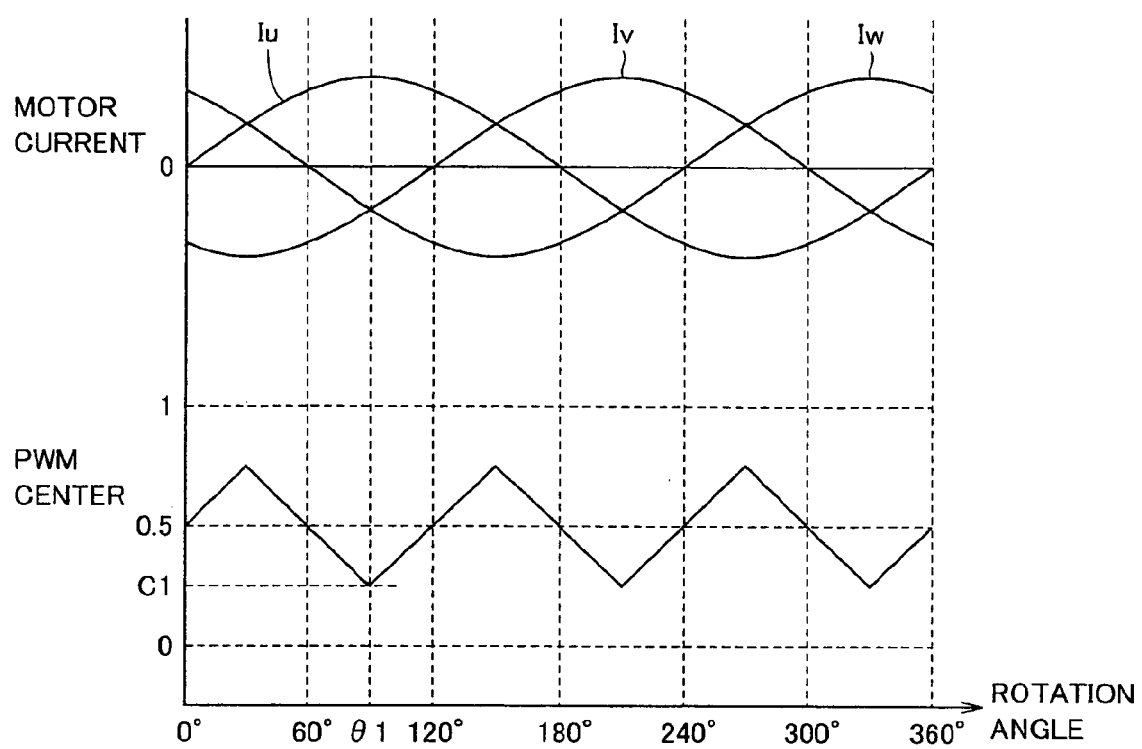
FIG. 12 shows an example of changes in the PWM center.

FIG. 12 shows an example of changes in the PWM center. Referring to FIG. 12, the abscissa gives motor rotation angle θ, which becomes 0° when U-phase motor current Iu is 0. When motor rotation angle θ is in a range of 0°-60°, 120°-180° and 240°-300°, i.e., when the motor current of the phase greatest in current is negative, the PWM center is changed to exceed 0.5. When motor rotation angle θ is in a range of 60°-120°, 180°-240° and 300°-360°, i.e., when the motor current of the phase greatest in current is positive, the PWM center is changed to be smaller than 0.5.

A motor rotation angle θ1 and a PWM central value C1 shown in FIG. 12 will be described later in connection with a second embodiment.

A waveform of the PWM center shown in FIG. 12 is merely an example, and may be discontinuous, e.g., with respect to changes in motor rotation angle θ. However, the waveform that is continuous with respect to the changes in motor rotation angle θ can keep a better balance between the losses in inverter 10.

Even when the PWM center changes, the relative relationship between the respective phase modulated waves is maintained so that it does not change the interphase voltage contributing to the generated torque of motor generator MG.

According to the first embodiment, as described above, when the carrier frequency (switching frequency) of inverter 10 is lower than a predetermined threshold, and thus is a low switching frequency making the on loss predominant, the variable control of the PWM center is performed to reduce the on less of inverter 10. Therefore, the first embodiment can effectively reduce the loss of inverter 10.

Second Embodiment

As described above, in the motor lock state wherein the motor rotation number is extremely low, the current concentrates in a specific phase to cause remarkably the thermally severe conditions. Therefore, the second embodiment executes the variable control on the PWM center when the switching frequency of the inverter is low and the motor lock state is being sensed.

An electric-powered vehicle of the second embodiment has the same power train structure as electric-powered vehicle 100 of the first embodiment shown in FIG. 1.

Figure 13:
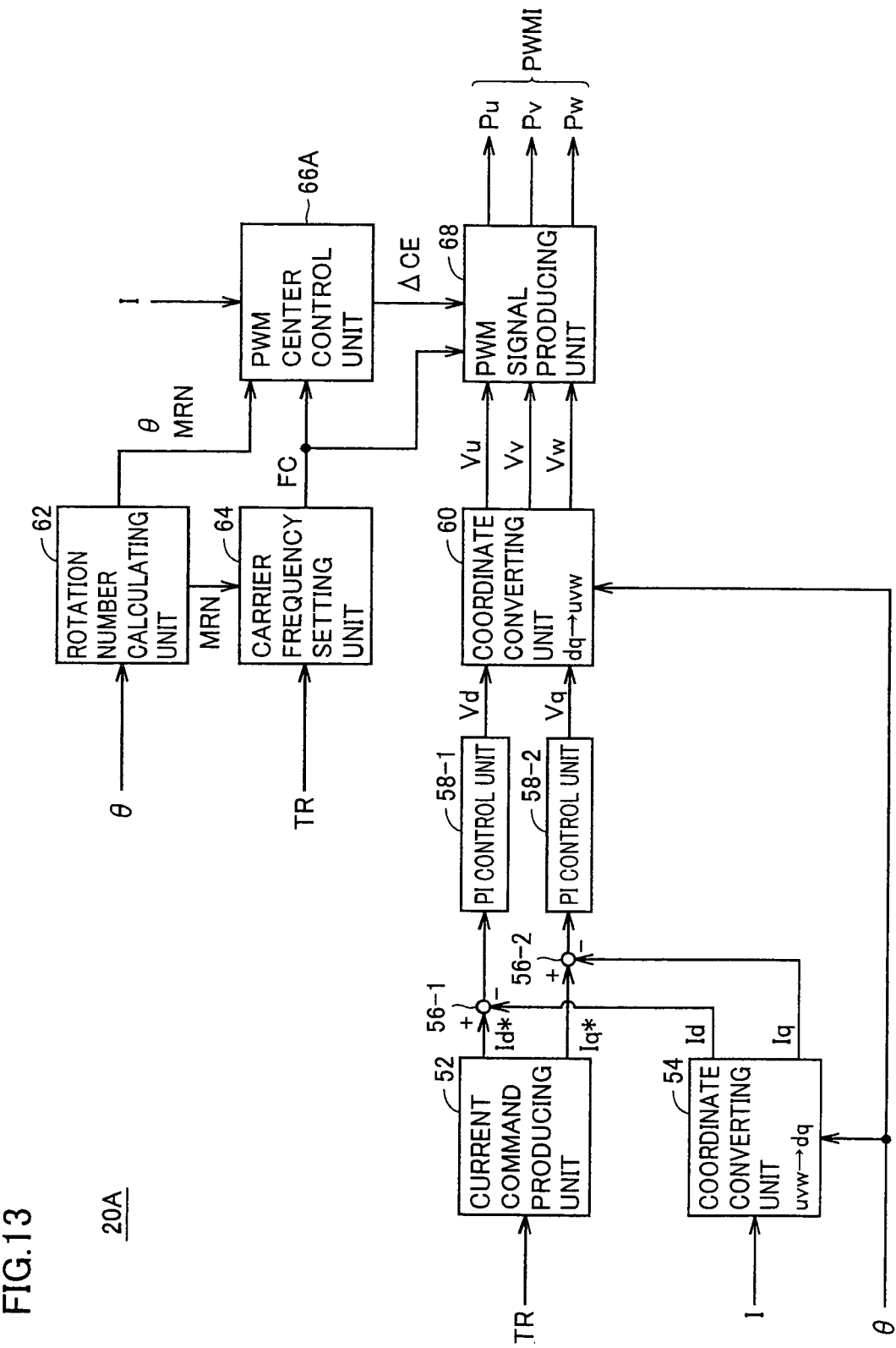
FIG. 13 is an ECU functional block diagram in a second embodiment.

FIG. 13 is a functional block diagram of an ECU 20A in the second embodiment. Referring to FIG. 13, ECU 20A has the same structure as ECU 20 in the first embodiment shown in FIG. 2 except for that it includes a PWM center control unit 66A instead of PWM center control unit 66.

PWM center control unit 66A receives motor rotation angle θ and motor rotation number MRN from rotation number calculating unit 62, and receives carrier frequency FC from carrier frequency setting unit 64. When carrier frequency FC is lower than a predetermined threshold and motor rotation number MRN is lower than a predetermined threshold, PWM center control unit 66A produces PWM center correction value ΔCE for variably controlling the PWM center by the foregoing method, and provides PWM center correction value ΔCE thus produced to PWM signal producing unit 68.

Figure 14:
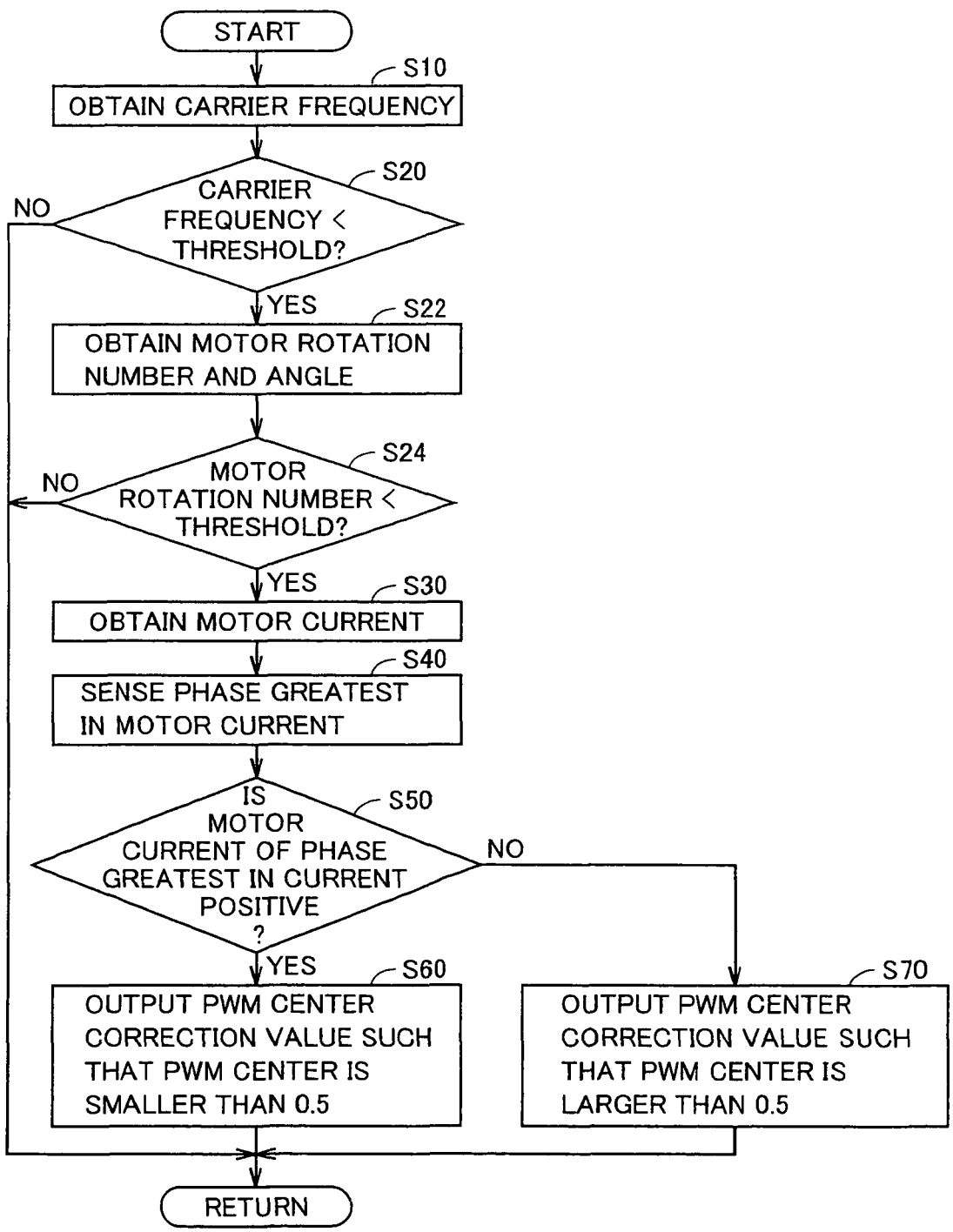
FIG. 14 is a flowchart illustrating a control structure of a PWM center control unit shown in FIG. 13.

FIG. 14 is a flowchart illustrating a control structure of PWM center control unit 66A shown in FIG. 13. The processing shown in this flowchart is likewise called from the main routine for execution at intervals of a predetermined time or when predetermined conditions are satisfied.

Referring to FIG. 14, this flowchart includes steps S22 and S24 in addition to those in the flowchart shown in FIG. 11. When it is determined in step S20 that carrier frequency FC is lower than the threshold (YES in step S20), PWM center control unit 66A obtains motor rotation number MRN and motor rotation angle θ (step S22).

Then, PWM center control unit 66A determines whether motor rotation number MRN is lower than a predetermined value or not (step S24). This threshold is employed for sensing the motor lock state, which can occur when the forward torque is balanced with the vehicle weight, e.g., during slope climbing. When motor rotation number MRN is lower than the threshold and the motor lock state is sensed in step S24 (YES in step S24), PWM center control unit 66A moves the processing to a step S30.

Figure 15:
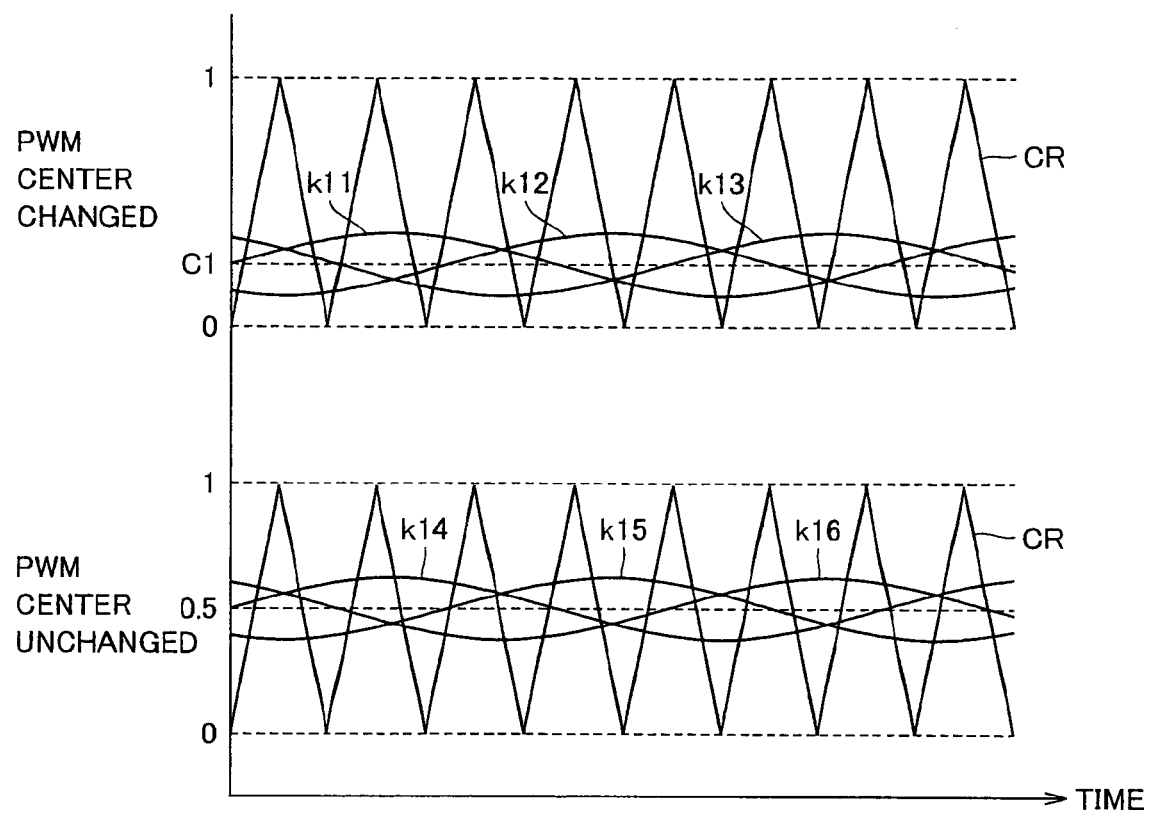
FIG. 15 is a waveform diagram of modulated waves at the time of motor lock.

FIG. 15 is a waveform diagram of the modulated waves at the time of motor lock. FIG. 15 shows waveforms of the modulated waves that appear when the motor rotation angle in the motor lock state is θ1 shown in FIG. 12. For a comparison, FIG. 15 also shows waveforms of modulated waves appearing when the PWM center is not changed (corresponding to the conventional technique).

Referring to FIG. 15, a triangular wave CR represents the carrier. Curves k11-k13 represent the U-, V- and W-phase modulated waves appearing when the motor rotation angle is θ1 in the motor lock state, respectively. As described above, when the motor rotation angle is θ1, the current of the U-phase that is the phase greatest in current is positive, and the PWM center is changed to C1 smaller than 0.5. Therefore, each phase modulated wave forms a sinusoidal wave of which center is C1 smaller than 0.5.

Curves k14-k16 represent the respective phase modulated waves appearing when the PWM center is not changed. In this case, each phase modulated wave forms a sinusoidal wave of which center is 0.5 (central value of the carrier).

When the modulated wave is larger than the carrier, the PWM signal is produced to turn on the transistor of the upper arm (to turn off the transistor of the lower arm). When the PWM center is changed to C1 smaller than 0.5, the on time of the transistor of the upper arm of each phase becomes short, as compared with the case where the PWM center does not change from 0.5. Therefore, when the motor rotation angle is θ1, the on loss of transistor Q1 of the upper arm of the U-phase, i.e., the phase greatest in current decreases, and the overheating of the U-phase can be prevented.

As described above, the second embodiment is configured to control variably the PWM center when the carrier frequency (switching frequency) of inverter 10 is lower than the predetermined threshold and motor rotation number MRN is lower than the predetermined threshold (when the motor lock state is sensed), i.e., when the thermally severe conditions remarkably appear because the current concentrates in a specific phase due to low motor rotation number MRN. Therefore, the predominant on loss can be effectively reduced. Accordingly, the second embodiment can prevent the concentrated flowing of the current in a specific element or phase. Consequently, the overheating and damage of inverter 10 can be prevented.

Third Embodiment

A third embodiment will be described below in connection with an example of a quantity of change of the PWM center in the motor lock state. More specifically, the PWM center is changed to keep a balance between the on losses of the respective phases while reducing the on loss of the phase greatest in current.

The whole structures of the electric-powered vehicle and the ECU according to the third embodiment are the same as those of electric-powered vehicle 100 shown in FIG. 1 and ECU 20A shown in FIG. 13. A method of determining the PWM center in the third embodiment will be described below.

It is now assumed that the motor lock state occurs at motor rotation angle θ1 (at which U-phase motor current Iu attains a peak) shown in FIG. 12. It is also assumed that diodes D1-D6 have more thermal margins than transistors Q1-Q6.

A loss ΔLu of transistor Q1 of the U-phase upper arm can be expressed by the following equation:

$$\Delta Lu = \int (V_{CE} \times I_{CE}) dt + \int (V_{ON1} \times I_{CE}) dt \quad (5)$$

where the first term in the right side represents the switching loss, and the second term in the right side represents the on loss. $V_{CE}$ represents a collector-emitter voltage, and $I_{CE}$ represents a current flowing through transistor Q1. $V_{ON1}$ represents a collector-emitter voltage (on voltage) that appears when transistor Q1 is on.

Since an on current of ($I_{CE}/2$) flows in each of transistors Q4 and Q6 of the V- and W-phase lower arms, a loss ΔLv of transistor Q4 or Q6 can be expressed by the following equations:

$$\Delta Lv = \int (V_{CE} \times I_{CE}/2) dt + \int (V_{ON2} \times I_{CE}/2) dt \quad (6)$$

where the first term in the right side represents the switching loss, and the second term in the right side represents the on loss. $V_{ON2}$ represents the on voltage of transistor Q4 or Q6.

As already described with reference to FIG. 3, in the motor lock state where motor rotation number MRN is extremely low, carrier frequency FC is set low, and the on loss becomes predominant in the loss of inverter 10. The balance can be kept between the on losses of the respective phases when the following equation is satisfied:

$$\int (V_{ON1} \times I_{CE}) dt = \int (V_{ON2} \times I_{CE}/2) dt \quad (7)$$

The on times of transistor Q1 of the U-phase upper arm and transistor Q4 of the V-phase lower arm (or transistor Q6 of the W-phase lower arm) are defined as follows.

Figure 16:
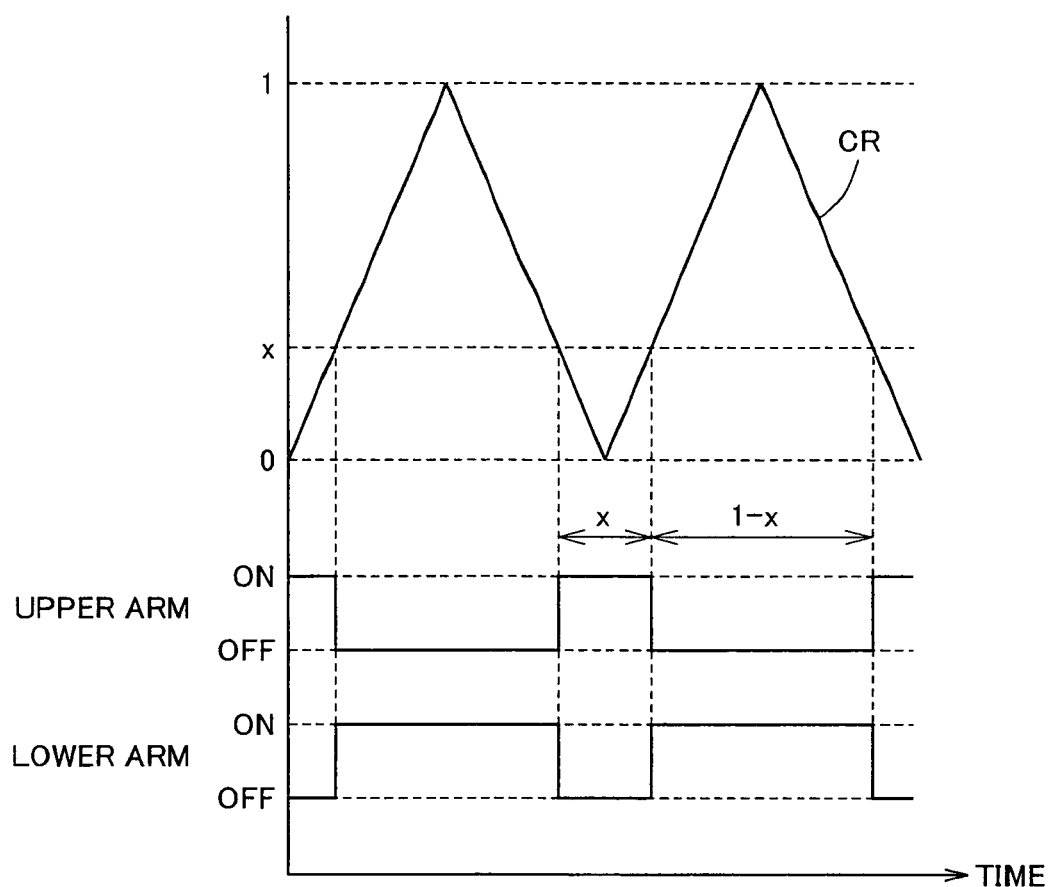
FIG. 16 illustrates a relationship between the PWM center and an on time of a transistor.

FIG. 16 illustrates a relationship between the PWM center and the on time of the transistor. Referring to FIG. 16, the PWM center is x (0<=x<=1). When the on time of transistor Q1 of the U-phase upper arm is defined as x, the on time of transistor Q4 on the V-phase lower arm becomes equal to (1−x). Thereby, the following equation is derived from the equation (7):

$$V_{ON1} \times I_{CE} \times x = V_{ON2} \times (I_{CE}/2) \times (1-x) \quad (8) \times$$

$$x = V_{ON2}/(2 \times V_{ON1} + V_{ON2}) \quad (9)$$

When $V_{ON2}$ is equal to, e.g., $V_{ON1}/2$, (x=0.2) is obtained from the equation (9).

According to the third embodiment, as described above, a balance can be kept between the on losses of the respective phases while reducing the on loss of the phase greatest in current.

Fourth Embodiment

In each of the embodiments described above, the PWM center is changed to reduce the on loss of the phase greatest in current and thereby to prevent overheating of the inverter. However, this fourth embodiment reduces the switching loss of the phase greatest in current to prevent overheating of the inverter when it is determined in advance that the switching loss is larger than the on loss.

The whole structures of the electric-powered vehicle and the ECU of the fourth embodiment are the same as those of electric-powered vehicle 100 shown in FIG. 1 and ECU 20A shown in FIG. 13.

Figure 17:
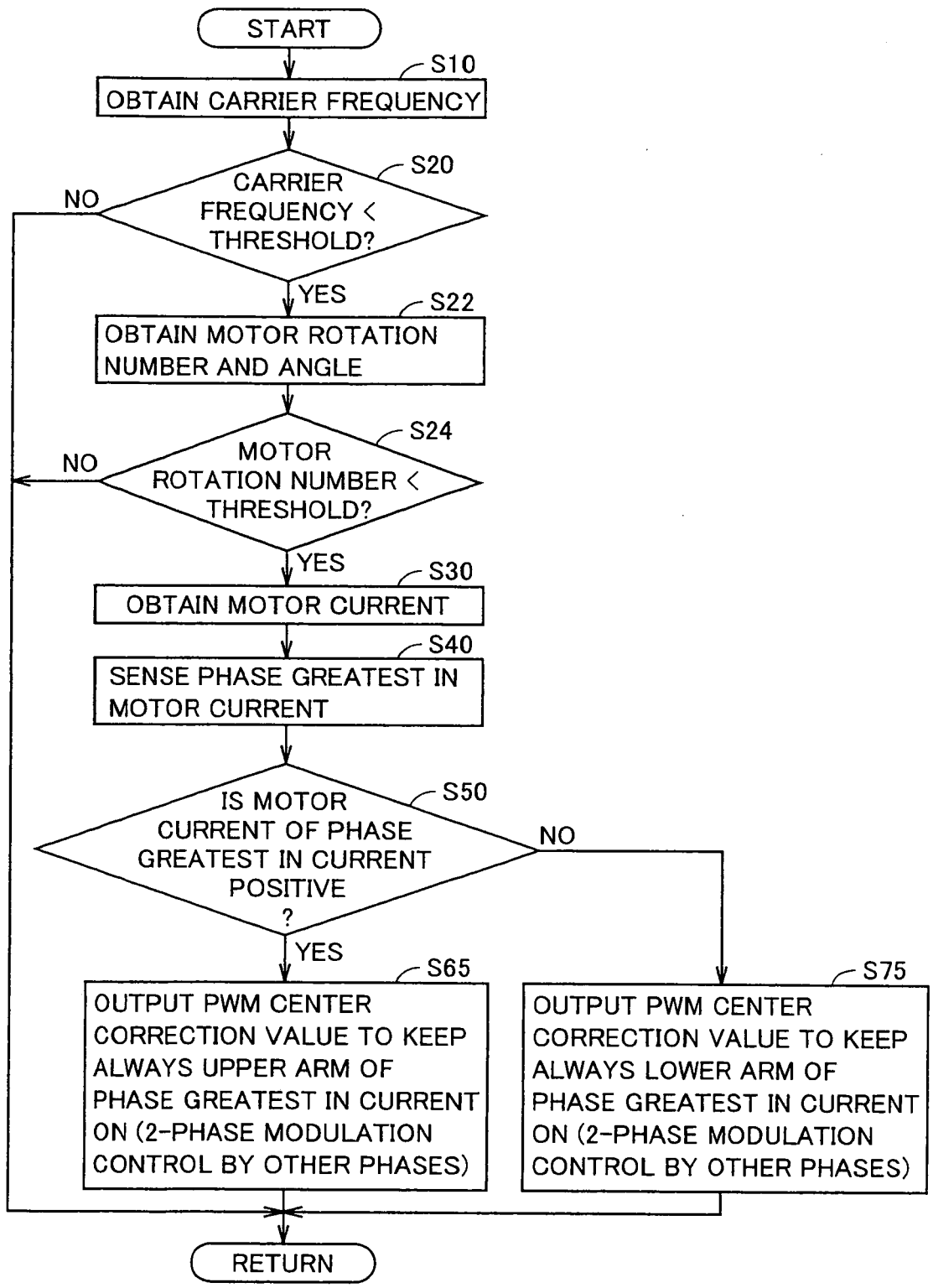
FIG. 17 is a flowchart illustrating a control structure of a PWM center control unit in a fourth embodiment.

FIG. 17 is a flowchart illustrating a control structure of a PWM center control unit in the fourth embodiment. Referring to FIG. 17, the flowchart differs from that shown in FIG. 14 in that the steps S65 and S75 are employed instead of steps S60 and S70 in FIG. 14. More specifically, when it is determined in step S50 that the motor current of the phase greatest in current is positive (YES in step S50), PWM center control unit 66A produces PWM center correction value ΔCE to keep always the transistors of the upper arm of the phase greatest in current in the on state, and provides it to PWM signal producing unit 68 (step S65).

More specifically, PWM center control unit 66A uses, as PWM center correction value ΔCE, a value obtained by subtracting the value of the modulated wave of the phase greatest in current from the maximum value of 1. Thereby, the modulated wave of the phase greatest in current attains the maximum value of 1, and the switching of the transistor of this phase stops (the upper arm is always on). The two-phase modulation control by the other phases is performed.

When it is determined in step S50 that the motor current of the phase greatest in current is negative (NO in step S50), PWM center control unit 66A produces PWM center correction value ΔCE to keep always the transistor of the lower arm of the phase greatest in current in the on state, and provides it to PWM signal producing unit 68 (step S75).

More specifically, PWM center control unit 66A uses, as PWM center correction value ΔCE, a value obtained by inverting the sign of the modulated value of the phase greatest in current. Thereby, the modulated wave of the phase greatest in current attains the minimum value of 0, and the switching of the transistor of this phase stops (the lower arm is always on). The two-phase modulation control by the other phases is performed.

Figure 18:
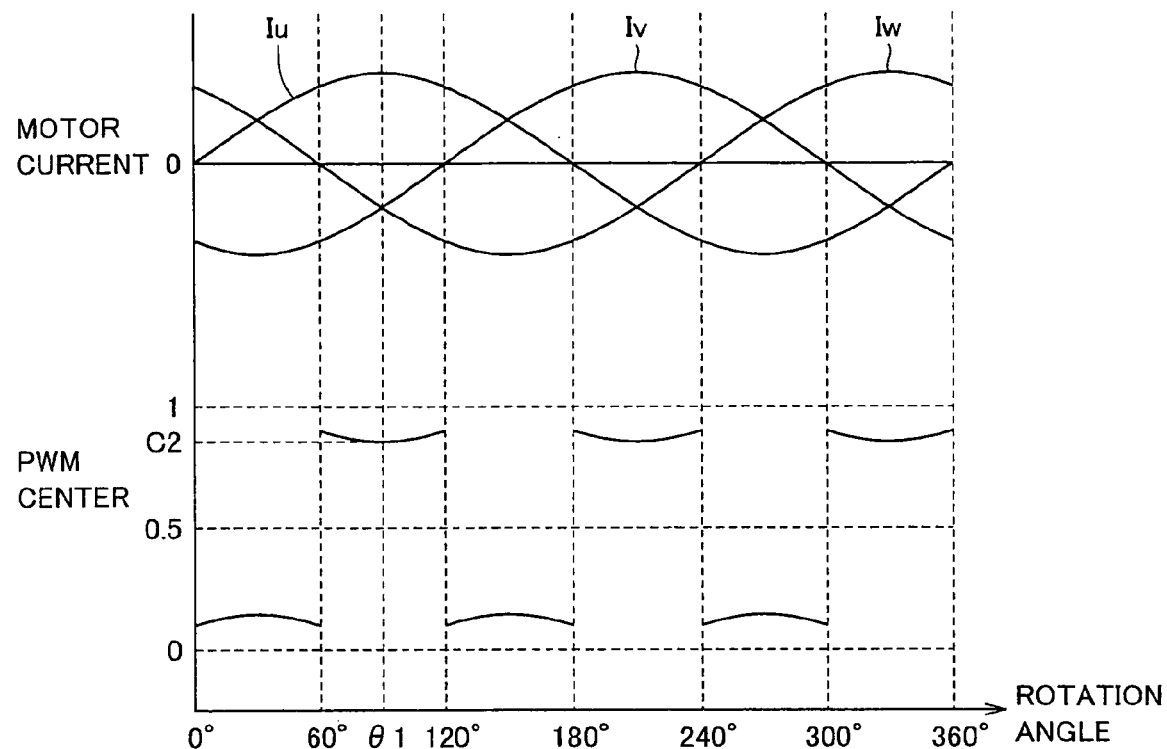
FIG. 18 shows changes in PWM center in the fourth embodiment.

FIG. 18 shows changes in PWM center in the fourth embodiment. Referring to FIG. 18, when the motor rotation angle θ is in a range of 0°-60°, 120°-180° and 240°-300°, i.e., when the motor current of the phase greatest in current is negative, the PWM center is changed so that the modulated wave of the phase greatest in current may attain the minimum value of 0. When motor rotation angle θ is in a range of 60°-120°, 180°-240° and 300°-360°, i.e., when the motor current of the phase greatest in current is positive, the PWM center is changed so that the modulated wave of the phase greatest in current may attain the maximum value of 1.

For example, when the motor lock state is sensed and the motor rotation angle is θ1, the phase greatest in current is the U-phase, and U-phase motor current Iu is positive so that the PWM center is changed to C2.

Figure 19:
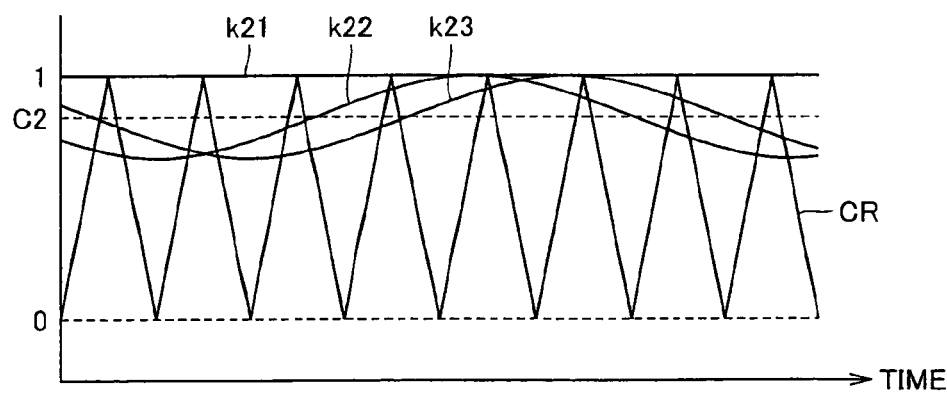
FIG. 19 is a waveform diagram of modulated waves at the time of motor lock in the fourth embodiment.

FIG. 19 is a waveform diagram of the modulated waves at the time of the motor lock in the fourth embodiment. FIG. 19 shows the waveform of the modulated wave appearing when the motor rotation angle in the motor lock state is θ1 shown in FIG. 18.

Referring to FIG. 19, straight line k21 and curves k22 and k23 represent the U-, V- and W-phase modulated waves appearing when the motor rotation angle in the motor lock state is θ1. As described above, when motor rotation angle is θ1, the current of the U-phase, i.e., the phase greatest in current is positive, and the PWM center is changed to C2 so that the U-phase modulated wave may attain the maximum value of 1. Therefore, the switching of the U-phase arm stops (the transistor of the upper arm is always on), and the two-phase modulation control by the V- and W-phases is performed.

In this fourth embodiment, the relative relationship between the modulated waves of the respective phases is maintained so that the inter-phase voltage contributing to the generated torque of motor generator MG does not change.

According to the fourth embodiment, as described above, when the switching loss is larger than the on loss and the motor lock state is sensed, the PWM center is changed so that the switching of the phase greatest in current may stop and the two-phase modulation control by the other phases may be performed. Therefore, the switching loss of the phase greatest in current becomes 0. According to the fourth embodiment, therefore, the overheating of inverter 10 can be prevented in the motor lock state.

Fifth Embodiment

In a fifth embodiment, the temperature of each transistor of the inverter is practically sensed, and the PWM center is changed to lower the temperature of the hottest transistor.

Figure 20:
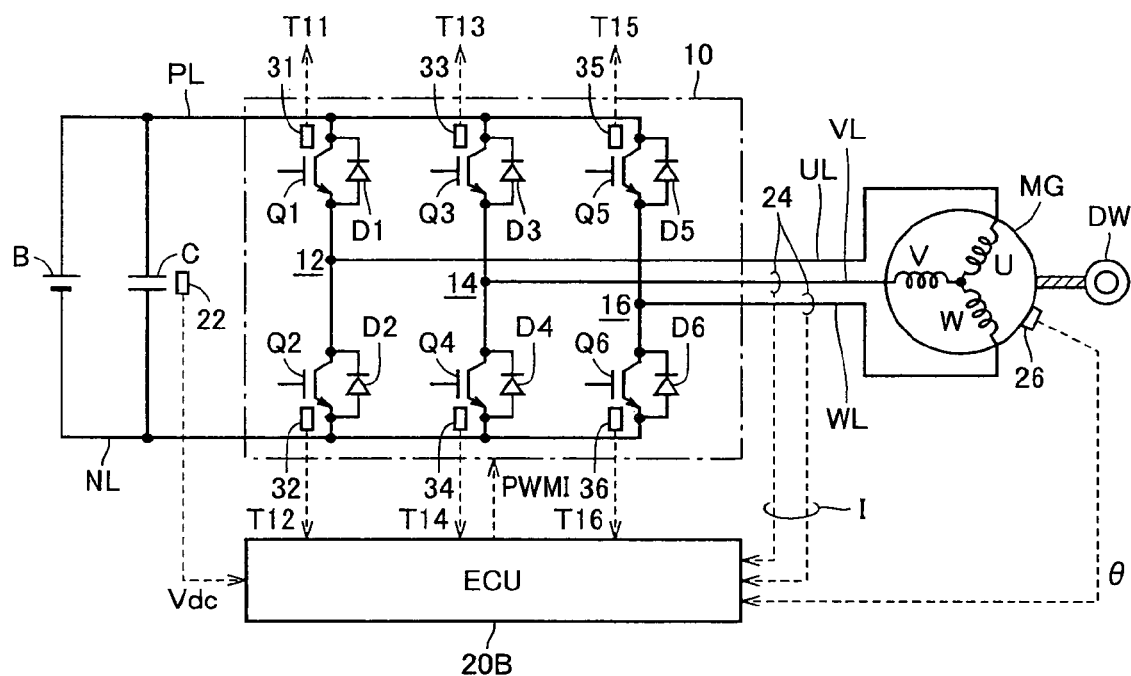
FIG. 20 shows a power train structure of an electric-powered vehicle of a fifth embodiment.

FIG. 20 shows a power train structure of an electric-powered vehicle of the fifth embodiment. Referring to FIG. 20, an electric-powered vehicle 100A has substantially the same structure as electric-powered vehicle 100 shown in FIG. 1 except for that temperature sensors 31-36 are additionally employed, and an ECU 20B is employed instead of ECU 20.

Temperature sensors 31-36 sense temperatures T11-T16 of transistors Q1-Q6, respectively, and provide sensed values to ECU 20B. Based on voltage Vdc, motor current I, motor rotation angle θ and temperatures T11-T16, ECU 20B produces signal PWMI for driving inverter 10 by a method to be described later, and provides signal PWMI thus produced to transistors Q1-Q6 of inverter 10.

Figure 21:
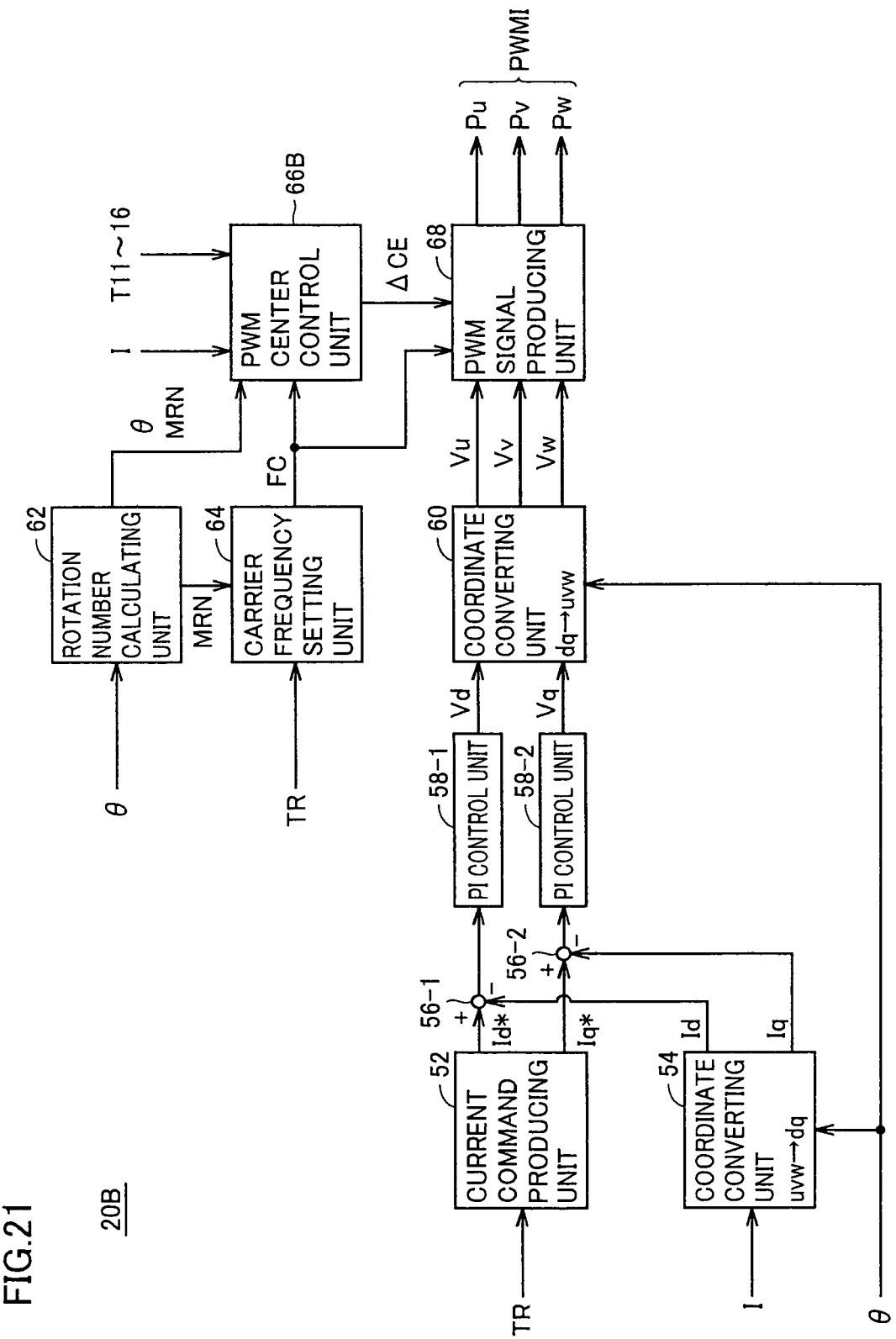
FIG. 21 is a functional block diagram of an ECU shown in FIG. 20.

FIG. 21 is a functional block diagram of ECU 20B shown in FIG. 20. Referring to FIG. 21, ECU 20B has substantially the same structure as that of ECU 20A shown in FIG. 13 except for that a PWM center control unit 66B is employed instead of PWM center control unit 66A. Based on motor rotation angle θ, motor rotation number MRN, motor current I and temperatures T11-T16, PWM center motor control unit 66B produces PWM center correction value ΔCE by the method to be described later, and provides PWM center correction value ΔCE thus produced to PWM signal producing unit 68.

Figure 22:
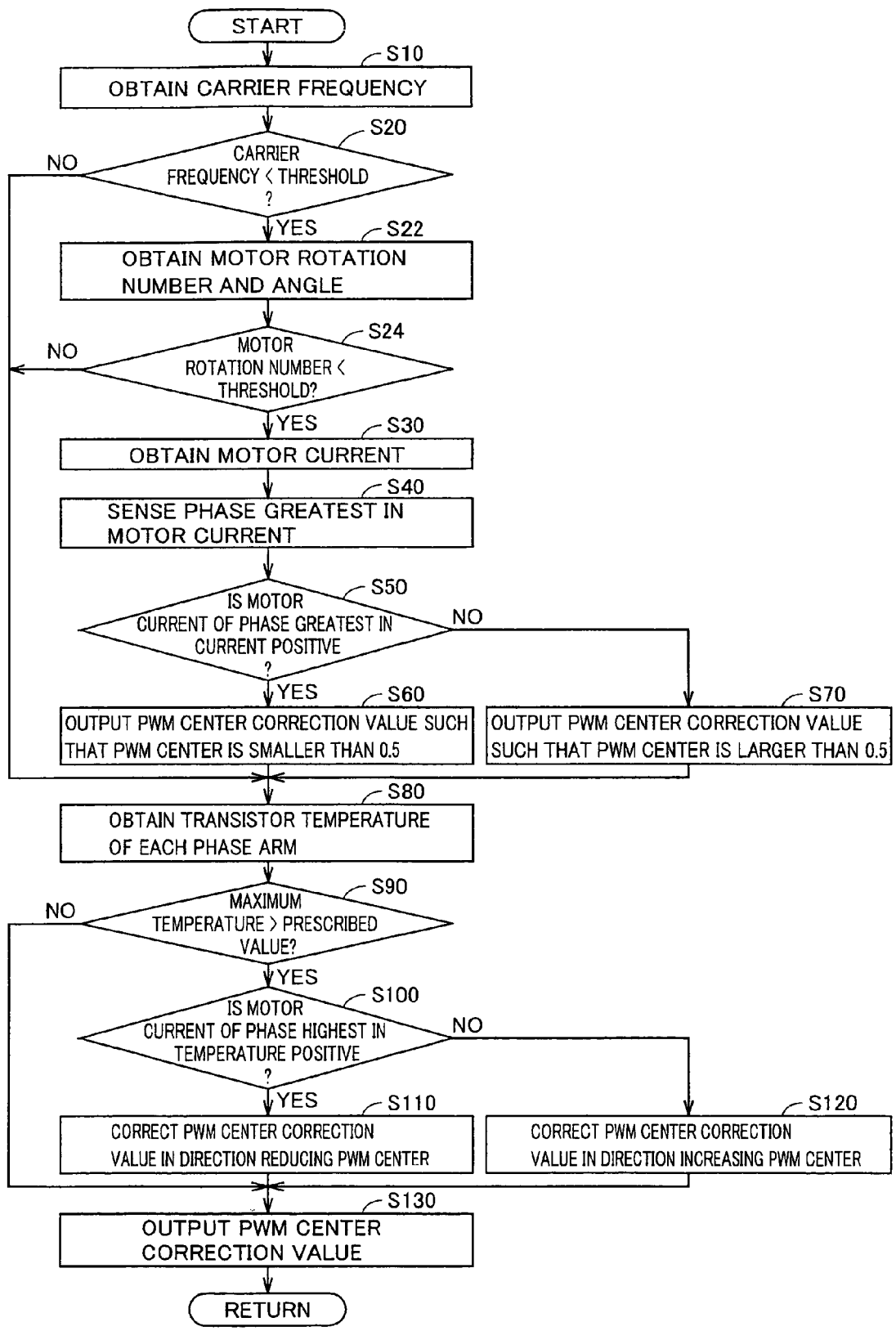
FIG. 22 is a flowchart illustrating a control structure of a PWM center control unit shown in FIG. 21.

FIG. 22 is a flowchart illustrating a control structure of PWM center control unit 66B shown in FIG. 21. Referring to FIG. 22, the flowchart includes steps S80-S130 in addition to the steps in the flowchart of FIG. 14. Thus, when PWM center correction value ΔCE is determined in steps S60 and S70, PWM center control unit 66B obtains temperatures T11-T16 of respective transistors Q1-Q6 (step S80), and determines whether the highest temperature among temperatures T11-T16 exceeds a prescribed value or not (step S90). This prescribed value is determined based on, e.g., a heat-resistant temperature of transistors Q1-Q6.

When it is determined that the maximum temperature does not exceed the prescribed value (NO in step S90), the process proceeds to step S130. When it is determined that the maximum temperature exceeds the prescribed value (YES in step S90), PWM center control unit 66B determines whether the motor current of the phase highest in temperature is positive or not (step S100).

When it is determined that the motor current of the phase highest in temperature is positive (YES in step S100), PWM center control unit 66B corrects PWM center correction value ΔCE produced in steps S60 and S70 in direction reducing the PWM center (step S110). When it is determined that the motor current of the phase highest in temperature is negative (NO in step S100), PWM center control unit 66B corrects PWM center correction-value ΔCE in direction increasing the PWM center (step S120).

PWM center control unit 66B provides PWM center correction value ΔCE to PWM signal producing unit 68 (step S130).

In steps S110 and S120, PWM center correction value ΔCE may be corrected by a predetermined fixed amount or an amount depending on a difference between a prescribed value and an excessive temperature.

According to the fifth embodiment, as described above, since the PWM center is corrected based on the temperatures of transistors Q1-Q6 of inverter 10, the overheating of inverter 10 can be reliably prevented.

Sixth Embodiment

Although consideration is given to the temperature of each transistor of the inverter in the fifth embodiment, consideration is further given to the temperatures of diodes D1-D6 in the sixth embodiment.

Figure 23:
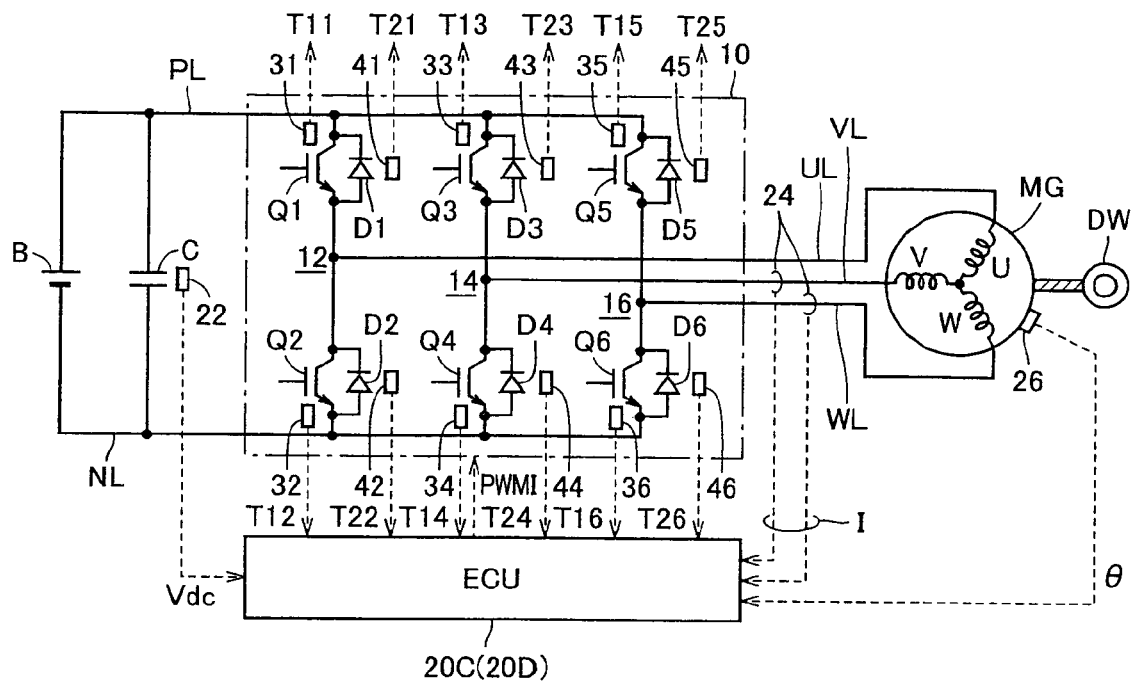
FIG. 23 shows a power train structure of an electric-powered vehicle of a sixth embodiment.

FIG. 23 shows a power train structure of an electric-powered vehicle of a sixth embodiment. Referring to FIG. 23, an electric-powered vehicle 100B has substantially the same structure as electric-powered vehicle 100A of the fifth embodiment shown in FIG. 20 except for that temperature sensors 41-46 are further employed, and an ECU 20C is employed instead of ECU 20B.

Temperature sensors 41-46 sense temperatures T21-T26 of diodes D1-D6, respectively, and provide sensed values to ECU 20. Based on voltage Vdc, motor current I, motor rotation angle θ and temperatures T11-T16 and T21-T26, ECU 20C produces signal PWMI for driving inverter 10 in the following method, and provides signal PWMI thus produced to transistors Q1-Q6 of inverter 10.

Figure 24:
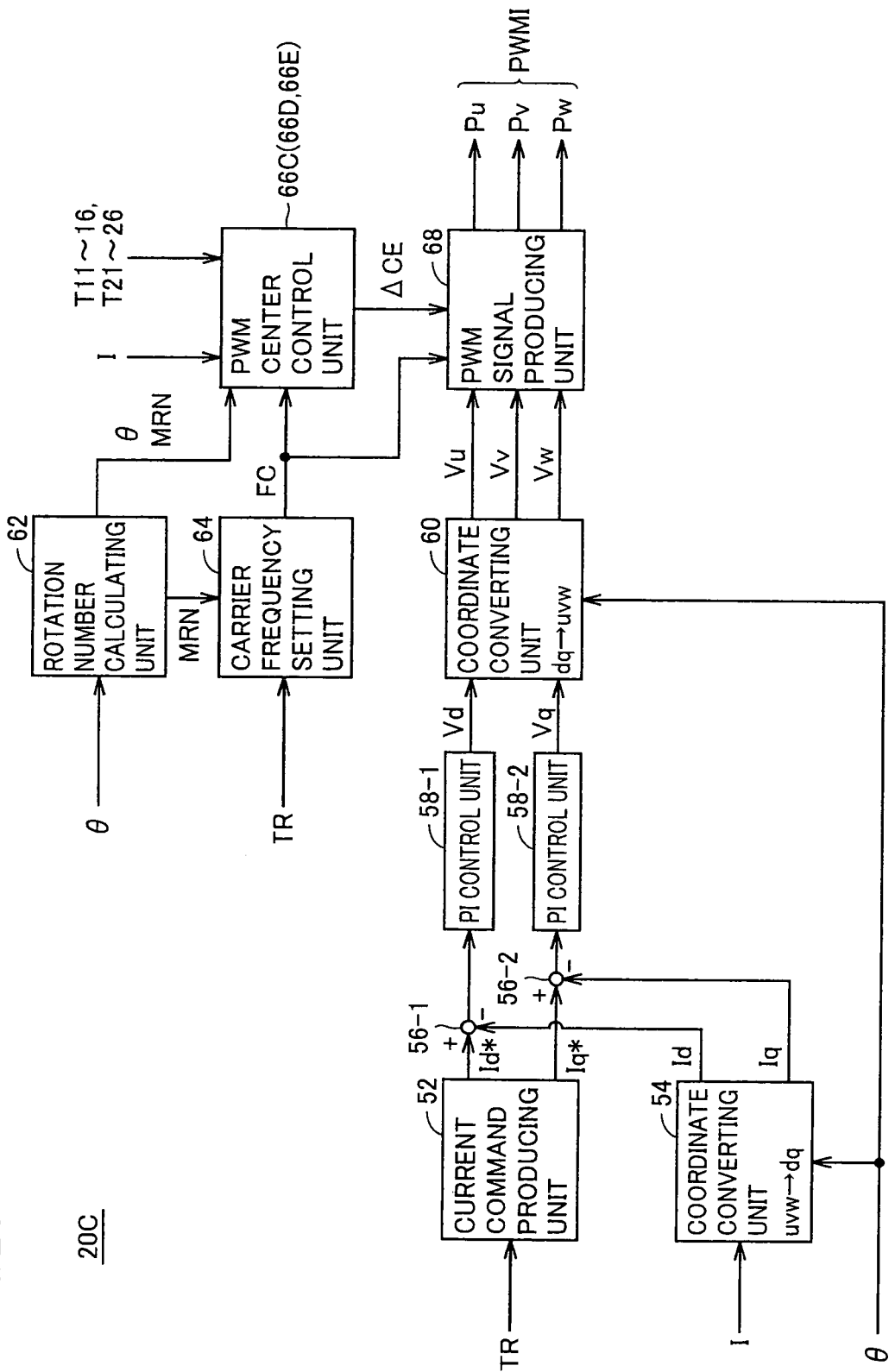
FIG. 24 is a functional block diagram of an ECU shown in FIG. 23.

FIG. 24 is a functional block diagram of ECU 20C shown in FIG. 23. Referring to FIG. 24, ECU 20C has substantially the same structure as ECU 20A shown in FIG. 13 except for that it includes a PWM center control unit 66C instead of PWM center control unit 66A. Based on motor rotation angle θ, motor rotation number MRN, motor current I and temperatures T11-T16 and T21-T26, PWM center control unit 66C produces PWM center correction value ΔCE by the method to be described later, and provides PWM center correction value ΔCE thus produced to PWM signal producing unit 68.

Figure 25:
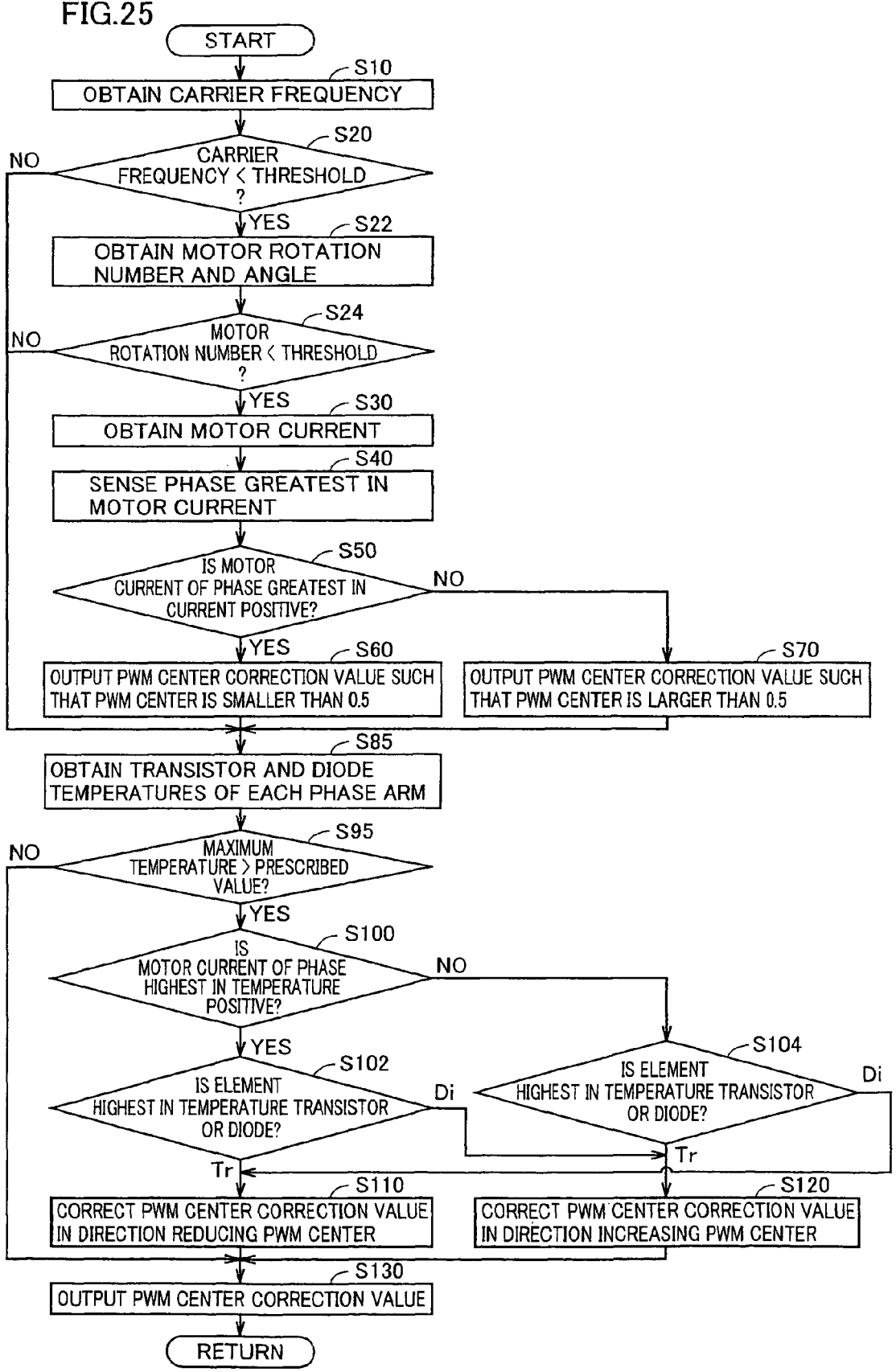
FIG. 25 is a flowchart illustrating a control structure of a PWM center control unit shown in FIG. 24.

FIG. 25 is a flowchart illustrating a control structure of PWM center control unit 66C shown in FIG. 24. Referring to FIG. 25, this flowchart differs from the flowchart shown in FIG. 22 in that it includes steps S85 and S95 instead of steps S80 and S90, and further includes steps S102 and S104. More specifically, when PWM center correction value ΔCE is determined in steps S60 and S70, PWM center control unit 66C obtains temperatures T11-T16 of transistors Q1-Q6 and temperatures T21-T26 of diodes D1-D6 (step S85), and determines whether the maximum temperature among temperatures T11-T16 and T21-T26 exceeds a prescribed value or not (step S95).

When it is determined in a subsequent step S100 that the motor current of the phase highest in temperature is positive (YES in step S100), PWM center control unit 66C determines whether the element highest in temperature is a transistor or a diode (step S102). When it is determined in step S102 that the element in question is a transistor ("Tr" in step S102), PWM center control unit 66C moves the processing to step S110. When it is determined in step S102 that the element in question is a diode ("Di" in step S102), PWM center control unit 66C moves the processing to step S120.

When it is determined in step S100 that the motor current of the phase highest in temperature is negative (NO in step S100), PWM center control unit 66C determines whether the element highest in temperature is a transistor or a diode (step S104). When it is determined in step S104 that the element is a transistor ("Tr" in step S104), PWM center control unit 66C moves the processing to step S120. When it is determined in step S104 that the element is a diode ("Di" in step S104), PWM center control unit 66C moves the processing to step S110.

As described above, since the sixth embodiment gives consideration not only to transistors Q1-Q6 but also to diodes D1-D6, this embodiment can prevent overheating of inverter 10 more reliably.

Seventh Embodiment

In a seventh embodiment, when the element temperature of the inverter exceeds a prescribed value, the phases of the motor current are changed to reduce the current of the phase highest in temperature.

Figure 26:
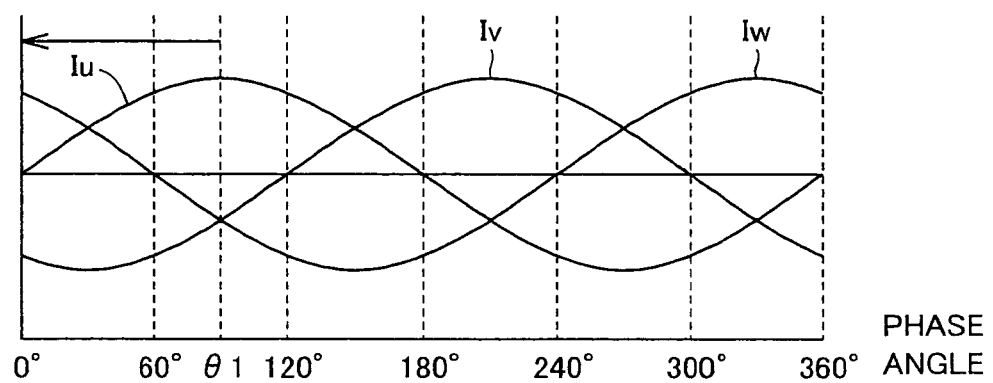
FIG. 26 shows waveforms of respective phase motor currents.

FIG. 26 shows waveforms of respective phase motor currents. Referring to FIG. 26, the abscissa gives a current phase angle, which corresponds to motor rotation angle θ. It is now assumed that the current phase angle is θ1 when the motor lock state is sensed. In this case, a current concentrates in transistor Q1 of the U-phase upper arm and a temperature of transistor Q1 increases. However, the seventh embodiment forcedly changes the current phase angle to reduce U-phase motor current Iu (e.g., to 0) when the temperature of transistor Q1 exceeds a prescribed value.

When the current phase angle changes, motor generator MG rotates an amount corresponding to this change in phase, and the vehicle slightly moves. Accordingly, the direction of the change in current phase angle is determined so that motor generator MG rotates in a rotation direction reversely corresponding to the running direction of the vehicle. This is for the following reasons. Since the vehicle in the motor lock state cannot move in the running direction (e.g., during the slope climbing), a balanced state cannot be attained even when the current phase angle changes to rotate motor generator MG in a rotation direction corresponding to the running direction of the vehicle. Therefore, the direction is described above. Conversely, when the current phase angle changes to rotate motor generator MG in the rotation direction reversely corresponding to the running direction of the vehicle, the vehicle gradually moves down to enter the balanced state.

The whole structure of the electric-powered vehicle according to the seventh embodiment is the same as that of electric-powered vehicle 100B shown in FIG. 23.

Figure 27:
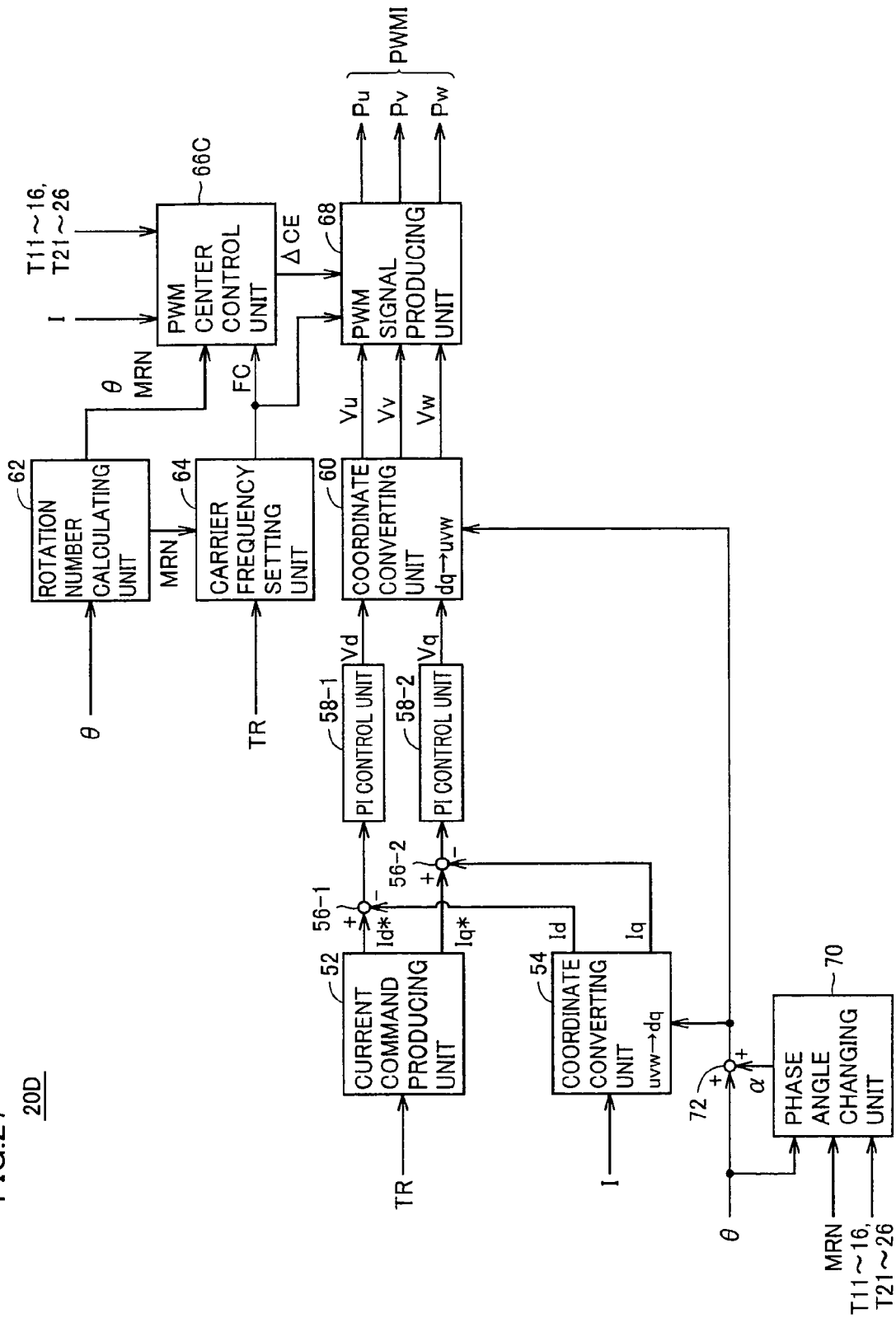
FIG. 27 is a functional block diagram of an ECU in a seventh embodiment.

FIG. 27 is a functional block diagram of the ECU in the seventh embodiment. Referring to FIG. 27, ECU 20D further includes a phase angle changing unit 70 and an adder 72 in addition to the structures of ECU 20C shown in FIG. 24.

Based on motor rotation angle θ, motor rotation number MRN and temperatures T11-T16 and T21-T26, phase angle changing unit 70 calculates a phase angle change amount α by a method to be described later, and provides phase angle change amount α thus calculated to adder 72. Motor rotation number MRN is provided from rotation number calculating unit 62. Adder 72 adds phase angle change amount α to motor rotation angle θ sensed by rotation angle sensor 26, and provides a result of this calculation, as the motor rotation angle, to coordinate converting units 54 and 60.

Figure 28:
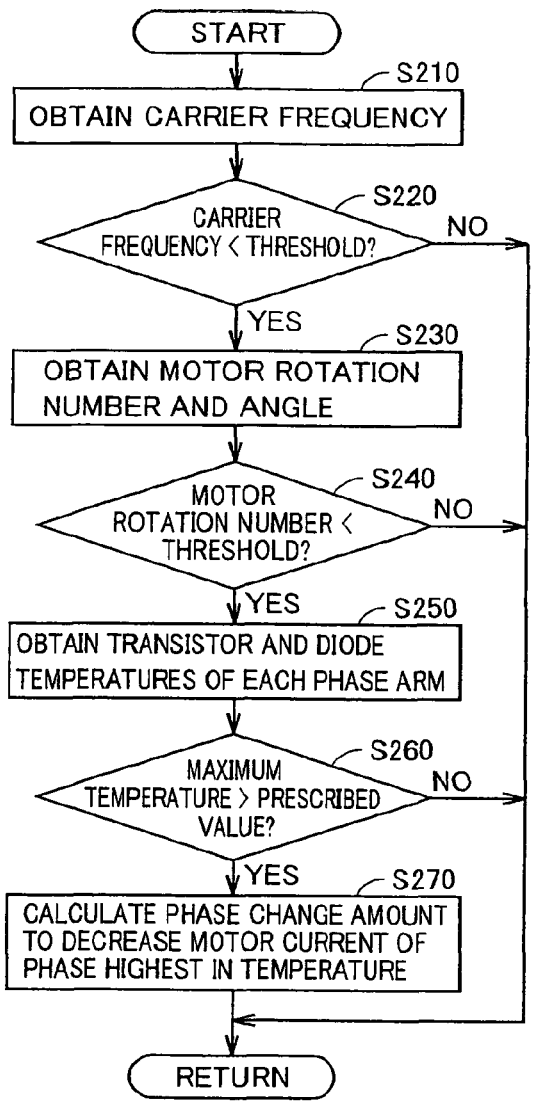
FIG. 28 is a flowchart illustrating a control structure of a phase angle changing unit shown in FIG. 27.

FIG. 28 is a flowchart illustrating a control structure of phase angle changing unit 70 shown in FIG. 27. Referring to FIG. 28, when phase angle changing unit 70 obtains carrier frequency FC from carrier frequency setting unit 64 (step S210), it determines whether carrier frequency FC is lower than a predetermined value of not (step S220). Phase angle changing unit 70 obtains motor rotation number MRN and motor rotation angle θ (step S230), and determines whether motor rotation number MRN is lower than a predetermined threshold or not (step S240). This threshold is used for sensing the motor lock state.

When motor rotation number MRN is lower than the threshold and the motor lock state is sensed (YES in step S240), phase angle changing unit 70 obtains temperatures T11-T16 of transistors Q1-Q6 and temperatures T21-T26 of diodes D1-D6 (step S250), and determines whether the maximum temperature among temperatures T11-T16 and T21-T26 exceeds a prescribed value or not (step S260). This prescribed value is determined based on, e.g., the heat-resistant temperature of transistors Q1-Q6.

When the maximum temperature exceeds a prescribed value (YES in step S260), phase angle changing unit 70 calculates, based on present motor rotation angle θ, phase angle change amount α to reduce the motor current of the phase highest in temperature (step S270). More specifically, since the phase angle at which the motor current becomes 0 is already known in each phase, phase angle changing unit 70 determines, as phase angle change amount α, a phase angle difference between currently motor rotation angle θ and the phase angle at which the current of the phase greatest in current becomes 0, in the direction that causes rotation of motor generator MG in the rotating direction reversely corresponding to the running direction of the vehicle.

This motor lock state may be sensed, using a sensed result obtained in the PWM center control unit.

According to the seventh embodiment, since the current of the phase highest in temperature decreases, the element temperature of phase the highest in temperature can be reliably reduced. This seventh embodiment is effective in the case where the element temperature may exceed the prescribed value even when the PWM center is changed. Therefore, the prescribed temperature value in step S260 may be set to exceed the prescribed temperature value in the PWM center control unit.

Eighth Embodiment

The second to seventh embodiments already described relate to the motor lock state. Conversely, an eighth embodiment variably controls the PWM center for reducing the loss of the whole inverter even when the motor rotation number is in a range other than the motor lock state.

Figure 29:
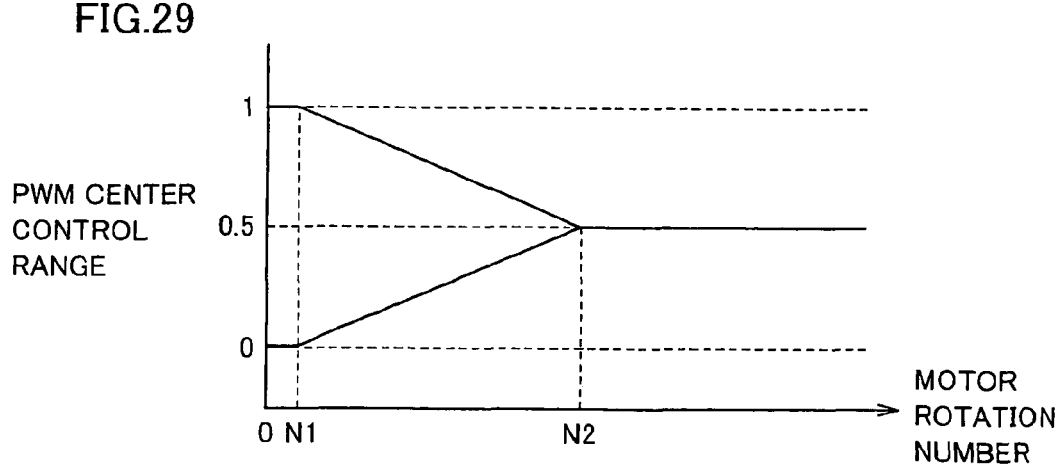
FIG. 29 shows a control range of the PWM center with respect to a motor rotation number.

FIG. 29 shows a control range of the PWM center with respect to motor rotation number MRN. Referring to FIG. 29, the abscissa gives motor rotation number MRN, and N1 represents the threshold for sensing the motor lock state. When motor rotation number MRN is lower than N1 and thus is in the motor lock state, the PWM center is changed within the range from 0 to 1 according to the control employed in one of the second to seventh embodiments so that the overheating of inverter 10 is suppressed.

When motor rotation number MRN is equal to or higher than N1, the PWM center is controlled to attain the value that is determined off-line in advance so that the whole loss of the inverter may become minimum. Thus, the PWM center minimizing the total loss of inverter 10 is predetermined for each current phase by an experiment or the like, and is mapped corresponding to respective motor rotation angles θ. Using this map, the PWM center is set based on motor rotation angle θ. For example, the PWM center may exhibit the changes shown in FIG. 12.

When motor rotation number MRN rises, each phase voltage command increases, and the amplitude of the modulated wave increases so that the control range of the PWM center is restricted according to the rising of motor rotation number MRN. Assuming that the modulated wave has the maximum amplitude when the motor rotation number is N2, PWM center cannot be changed from 0.5 when motor rotation number MRN attains N2 or more.

The eighth embodiment variably controls the PWM center within a range of solid line shown in FIG. 29. More specifically, within the range of motor rotation number MRN from N1 to N2, the PWM center is set using the map so that the total loss of the inverter may become minimum within the range of the solid line shown in FIG. 29. When motor rotation number MRN exceeds N2, the PWM center is fixed to 0.5.

The whole structures of the electric-powered vehicle and the ECU in the eighth embodiment are the same as those of electric-powered vehicle 100B shown in FIG. 23 and ECU 20C shown in FIG. 24.

Figure 30:
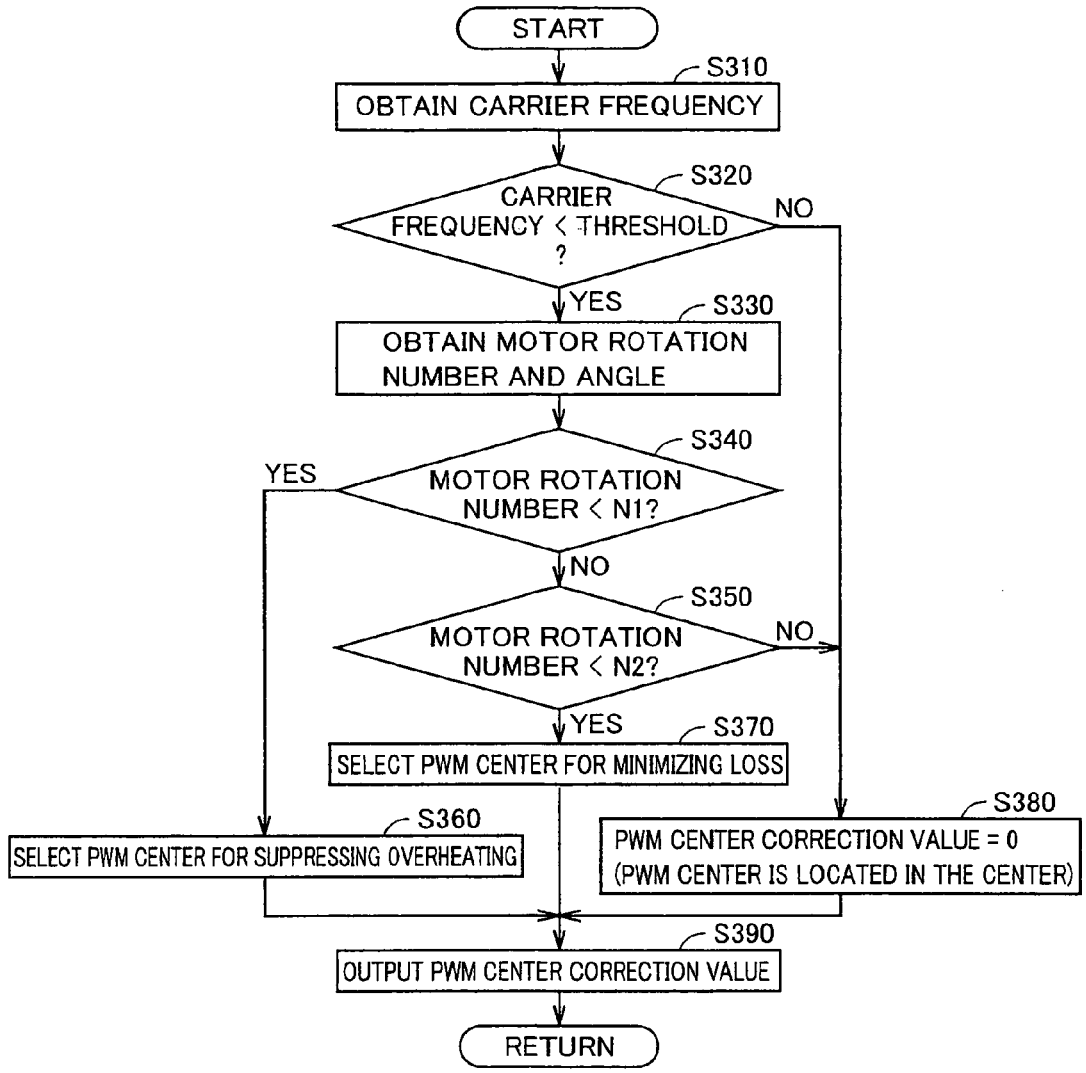
FIG. 30 is a flowchart illustrating a control structure of a PWM center control unit in an eighth embodiment.

FIG. 30 is a flowchart illustrating a control structure of a PWM center control unit 66D in the eighth embodiment. Referring to FIG. 30, when PWM center control unit 66D obtains carrier frequency FC from carrier frequency setting unit 64 (step S310), it determines whether carrier frequency FC is lower than a predetermined threshold or not (step S320). When it is determined that carrier frequency FC is lower than the threshold (YES in step S320), PWM center control unit 66D obtains motor rotation number MRN and motor rotation angle θ (step S330), and determines whether motor rotation number MRN is lower than threshold N1 or not (step S340). This threshold N1 is used for sensing the motor lock state.

When it is determined that motor rotation number MRN is lower than threshold N1 (YES in step S340), PWM center control unit 66D produces PWM center correction value ΔCE to set the PWM center used for suppressing the overheating (step S360). More specifically, PWM center control unit 66D calculates PWM center correction value ΔCE, using the manner already described in connection with the embodiments already described.

When it is determined in step S340 that motor rotation number MRN is equal to threshold N1 or more (NO in step S340), PWM center control unit 66D determines whether motor rotation number MRN is lower than threshold N2 (>N1) or not (step S350).

When it is determined that motor rotation number MRN is lower than threshold N2 (YES in step S350), PWM center control unit 66D produces PWM center correction value ΔCE to set the PWM center for the minimum loss (step S370). More specifically, PWM center control unit 66D determines the PWM center for the minimum loss based on motor rotation angle θ, using the predetermined map, and calculates PWM center correction value ΔCE based on the determined PWM center.

When it is determined in step S350 that motor rotation number MRN is equal to threshold N2 or more (NO in step S350), PWM center control unit 66D sets PWM center correction value ΔCE to 0 so that the PWM center may become 0.5 (step S380). PWM center control unit 66D provides PWM center correction value ΔCE to PWM signal producing unit 68 (step S390).

Since the eighth embodiment variably controls the PWM center to lower the total loss of the inverter in the motor rotation number range (<N2) of the state other than the motor lock state, the energy cost can be reduced.

Ninth Embodiment

As described above, when motor rotation number MRN rises, the amplitude of the modulated wave increases. Therefore, even when the control range of the PWM central value is restricted, the modulated wave may practically reach the upper or lower limit (0 or 1). Further, in the motor lock region (where the motor rotation number is lower than N1), the modulated wave may reach the upper or lower limit in a certain situation of the vehicle. Accordingly, a ninth embodiment restricts in real time the variable region of the PWM center to fall within a range that prevents the modulated wave from exceeding the upper and lower limits (1 and 0).

Figure 31:
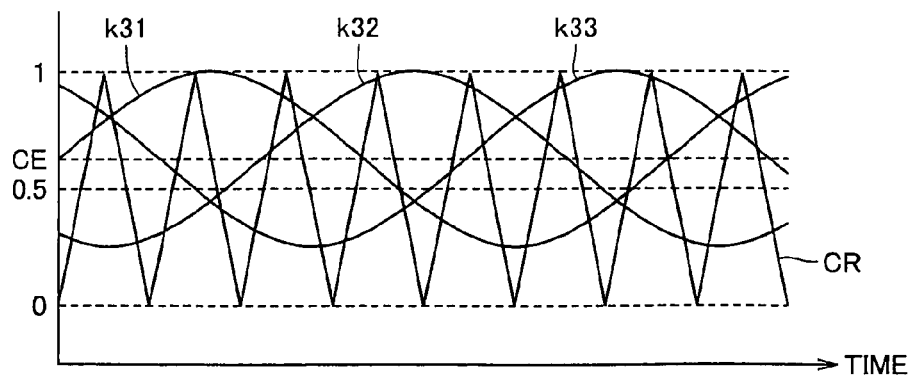
FIG. 31 is a waveform diagram of modulated waves.

FIG. 31 is a waveform diagram of the modulated waves. Referring to FIG. 31, curves k31-k33 represent the modulated waves of the respective phases, and triangular wave CR represents the carrier. The PWM center is CE (>0.5), and the modulated wave of each phase has a peak value of the upper limit (1). In this ninth embodiment, PWM center correction value is restricted so that the PWM center may not exceed the CE.

The whole structures of the electric-powered vehicle and the ECU of the ninth embodiment are the same as those of the eighth embodiment.

FIG. 32 is a flowchart illustrating the control structure of a PWM center control unit 66E in the ninth embodiment. Referring to FIG. 32, the flowchart includes steps S400-S450 in addition to those in the flowchart shown in FIG. 30. More specifically, when PWM center correction value ΔCE is calculated in step S360 or S370, the modulated wave of each phase is recalculated based on PWM center correction value ΔCE (step S400). The maximum and minimum peak values of the recalculated modulated wave are calculated (step S410).

PWM center control unit 66E determines whether the maximum peak value of the modulated wave is larger than a predetermined value A or not (step S420). Predetermined value A is the maximum value of the carrier, and is equal to 1 in this embodiment.

When it is determined in step S420 that the maximum peak value of the modulated wave is larger than predetermined value A (YES in step S420), PWM center control unit 66E corrects PWM center correction value ΔCE to reduce the PWM center by ((maximum peak value)−A) in a step S430. Thereafter, PWM center control unit 66E moves the processing to step S390.

Conversely, when it is determined in step S420 that the maximum peak value of the modulated wave is equal to predetermined value A or less (NO in step S420), PWM center control unit 66E determines whether the minimum peak value of the modulated wave is smaller than a predetermined value B or not (step S440). Predetermined value B is the minimum value of the carrier, and is 0 in this embodiment.

When it is determined in step S440 that the minimum peak value of the modulated wave is smaller than predetermined value B (YES in step S440), PWM center control unit 66E corrects PWM center correction value ΔCE to increase the PWM center by (B−(minimum peak value)) in step S450. Thereafter, PWM center control unit 66E moves the processing to step S390.

When it is determined in step S440 that the minimum peak value of the modulated wave is equal to predetermined value B or more (NO in step S440), PWM center control unit 66E moves the processing to step S390.

When the processing in step S380 is executed, PWM center control unit 66E moves the processing to step S390.

According to the ninth embodiment, as described above, the PWM center is restricted in real time so that the modulated wave may exceed neither the upper limit nor the lower limit. When the variable range of the PWM center is to be set in advance, margins are ensured with consideration given to variations in various parts and sensors, and therefore the variable range may become narrow. According to the ninth embodiment, however, the variable range of the PWM center can be increased to the maximum extent. Therefore, the loss of the inverter can be suppressed to the maximum extent within a range not causing failure in the motor control.

In each of the above embodiments, the control by the ECU is practically performed by a CPU (Central Processing Unit), which reads a program having the steps in the aforementioned flowcharts from a ROM (Read Only Memory), and executes the read program to execute the processing according to the aforementioned flowcharts. Therefore, the ROM corresponds to a computer-readable (CPU-readable) recording medium bearing the program that includes the various steps in the aforementioned flowcharts.

In each of the above embodiments, an a booster converter that boosts the voltage from power storage device B and supplies it to inverter 10 may be arranged between power storage device B and inverter 10. A known chopper circuit may be used as the above booster converter.

The invention can be applied to the electric vehicle that is equipped with motor generator MG as a motive power source for vehicle running, and can also be applied to a hybrid vehicle further equipped with an internal combustion engine as well as a fuel cell vehicle equipped with a fuel cell as a DC power supply.

In the above description, motor generator MG corresponds to the "AC motor" in the invention. PWM signal producing unit 68 corresponds to the "signal producing unit" in this invention, and PWM center control units 66 and 66A-66E correspond to the "control unit" in the invention. Further, current sensor 24 corresponds to the "current sensing unit" in the invention. Temperature sensors 31-36 and 41-46 correspond to the "temperature sensing unit" in the invention.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A control device for an electric-powered vehicle equipped with an AC motor as a motive power source for vehicle running, comprising:
    an inverter driving said AC motor;
    a signal producing unit for producing a signal for turning on/off a switching element of said inverter based on a pulse width modulation method; and
    a control unit configured to allow reduction of a loss of said inverter by variably controlling a central value of a modulated wave used in said signal producing unit, which changes a peak voltage of the modulated wave, when a switching frequency of said inverter is lower than a predetermined frequency; wherein
        said control unit is configured to suppress current concentration in said inverter by variably controlling the central value of said modulated wave when (i) the switching frequency of said inverter is lower than said predetermined frequency, and (ii) a rotation number of said AC motor is lower than a predetermined rotation number.

2. The control device for the electric-powered vehicle according to claim 1, wherein
    said predetermined frequency is set based on a region of the switching frequency in which an ON loss(es) of said inverter is relatively greater than a switching loss of said inverter.

3. The control device for the electric-powered vehicle according to claim 1, further comprising:
    a current sensing unit for sensing each phase current of said AC motor, wherein
    said control unit changes the central value of said modulated wave to become smaller than a central value of a carrier used in said signal producing unit when a current flows from said inverter to said AC motor in a phase greatest in current, and changes the central value of said modulated wave to become larger than the central value of said carrier when the current flows from said AC motor to said inverter in said phase greatest in current.

4. The control device for the electric-powered vehicle according to claim 3, wherein
    said control unit changes the central value of said modulated wave to a preobtained value to keep a balance among ON loss(es) of the respective phases of said inverter.

5. The control device for the electric-powered vehicle according to claim 1, wherein
    said control unit changes the central value of said modulated wave such that a switching operation of a phase greatest in current stops and a modulation control by another phase is performed in response to the fact that the modulated wave of the phase of the maximum current attains a predetermined maximum value or a predetermined minimum value.

6. The control device for the electric-powered vehicle according to claim 1, further comprising:
a temperature sensing unit for sensing an element temperature of said inverter, wherein
said control unit changes the central value of said modulated wave to become smaller than a central value of a carrier used in said signal producing unit when a current flows from said inverter to said AC motor in a phase highest in element temperature, and changes the central value of said modulated wave to become larger than the central value of said carrier when the current flows from said AC motor to said inverter in said phase highest in temperature.

7. The control device for the electric-powered vehicle according to claim 1, further comprising:
a temperature sensing unit for sensing an element temperature of said inverter; and
a phase angle changing unit for changing a phase angle of said modulated wave to reduce a value of the current flowing in a phase highest in element temperature.

8. The control device for the electric-powered vehicle according to claim 7, wherein
said phase angle changing unit changes the phase angle of said modulated wave to make said current value substantially equal to zero.

9. The control device for the electric-powered vehicle according to claim 1, wherein
said control unit variably controls the central value of said modulated wave to attain values preobtained for the respective phases of said modulated wave for minimizing a total loss of said inverter when the rotation number of said AC motor is equal to said predetermined rotation number or more.

10. The control device for the electric-powered vehicle according to claim 9, wherein
when a peak of said modulated wave exceeds a peak of a carrier as a result of changing the central value of said modulated wave, said control unit corrects the central value of said modulated wave such that the peak of said modulated wave becomes smaller than the peak of said carrier.

11. An electric-powered vehicle comprising:
an AC motor generating a drive power of the vehicle;
a wheel coupled to an output shaft of said AC motor; and
the control device according to claim 1.

12. A control method for an electric-powered vehicle equipped with an AC motor as a motive power source for vehicle running, comprising:
a first step of producing a signal for turning on/off a switching element of an inverter driving said AC motor, based on a pulse width modulation method; and
a second step of reducing a loss of said inverter by variably controlling a central value of a modulated wave used for production of said signal, which changes a peak voltage of the modulated wave, when a switching frequency of said inverter is lower than a predetermined frequency, wherein
in said second step, current concentration in said inverter is suppressed by variably controlling the central value of said modulated wave when (i) the switching frequency of said inverter is lower than said predetermined frequency, and (ii) a rotation number of said AC motor is lower than a predetermined rotation number.

13. The control method for the electric-powered vehicle according to claim 12, wherein
said predetermined frequency is set based on a region of the switching frequency in which an ON loss(es) of said inverter is relatively greater than a switching loss of said inverter.

14. The control method for the electric-powered vehicle according to claim 12, wherein
in said second step, the central value of the modulated wave is changed to become smaller than a central value of a carrier used for production of said signal when a current flows from said inverter to said AC motor in a phase greatest in current, and the central value of said modulated wave is changed to become larger than the central value of said carrier when the current flows from said AC motor to said inverter in said phase greatest in current.

15. The control method for the electric-powered vehicle according to claim 14, wherein
in said second step, the central value of said modulated wave is changed to a preobtained value to keep a balance among ON loss(es) of the respective phases of said inverter.

16. The control method for the electric-powered vehicle according to claim 12, wherein
in said second step, the central value of said modulated wave is changed such that a switching operation of a phase greatest in current stops and a modulation control by another phase is performed in response to the fact that the modulated wave of the phase of the maximum current attains a predetermined maximum value or a predetermined minimum value.

17. The control method for the electric-powered vehicle according to claim 12, wherein
in said second step, the central value of said modulated wave is changed to become smaller than a central value of a carrier used for producing said signal when a current flows from said inverter to said AC motor in a phase highest in element temperature of said inverter, and the central value of said modulated wave is changed to become larger than the central value of said carrier when the current flows from said AC motor to said inverter in said phase highest in temperature.

18. The control method for the electric-powered vehicle according to claim 12, further comprising:
a third step of changing a phase angle of said modulated wave to reduce a value of the current flowing in a phase highest in element temperature of said inverter.

19. The control method for the electric-powered vehicle according to claim 18, wherein:
in said third step, the phase angle of said modulated wave is changed to make said current value substantially equal to zero.

20. The control method for the electric-powered vehicle according to claim 12, further comprising:
a fourth step of variably controlling the central value of said modulated wave to attain values preobtained for the respective phases of said modulated wave to minimize a total loss of said inverter when the rotation number of said AC motor is equal to said predetermined rotation number or more.

21. The control method for the electric-powered vehicle according to claim 20, further comprising:
a fifth step of determining whether a peak of said modulated wave exceeds a peak of a carrier as a result of changing the central value of said modulated wave, or not; and
a sixth step of correcting the central value of said modulated wave such that the peak of said modulated wave becomes smaller than the peak of said carrier when it is determined that the peak of said modulated wave exceeds the peak of said carrier.

22. A non-transitory computer-readable recording medium storing a program for causing a computer to execute steps of controlling an electric-powered vehicle equipped with an AC motor as a motive power source for vehicle running, the steps comprising:

producing a signal for turning on/off a switching element of an inverter driving said AC motor, based on a pulse width modulation method; and reducing a loss of said inverter by variably controlling a central value of a modulated wave used for production of said signal, which changes a peak voltage of the modulated wave, when a switching frequency of said inverter is lower than a predetermined frequency, wherein current concentration in said inverter is suppressed by variably controlling the central value of said modulated wave when (i) the switching frequency of said inverter is lower than said predetermined frequency, and (ii) a rotation number of said AC motor is lower than a predetermined rotation number.

* * * * *